US012717604B2

(12) United States Patent
Han et al.

(10) Patent No.: US 12,717,604 B2
(45) Date of Patent: Aug. 25, 2026

(54) SIGNAL PROCESSING DEVICE AND DISPLAY APPARATUS FOR VEHICLE INCLUDING THE SAME

(71) Applicant: LG Electronics Inc., Seoul (KR)

(72) Inventors: Dongwoo Han, Seoul (KR); Namyong Park, Seoul (KR); Dongkyu Lee, Seoul (KR); Kyungjun Shin, Seoul (KR); Jaegu Yoon, Seoul (KR); Dukyung Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 417 days.

(21) Appl. No.: 18/278,336

(22) PCT Filed: Dec. 28, 2021

(86) PCT No.: PCT/KR2021/020056
§ 371 (c)(1),
(2) Date: Aug. 22, 2023

(87) PCT Pub. No.: WO2022/181960
PCT Pub. Date: Sep. 1, 2022

(65) Prior Publication Data

US 2024/0143375 A1 May 2, 2024

(30) Foreign Application Priority Data

Feb. 26, 2021 (KR) ........................ 10-2021-0026453
Apr. 23, 2021 (KR) ........................ 10-2021-0053004

(51) Int. Cl.
*G06F 9/455* (2018.01)
*B60K 35/00* (2024.01)
(Continued)

(52) U.S. Cl.
CPC ........ *G06F 9/45558* (2013.01); *B60K 35/213* (2024.01); *B60K 35/22* (2024.01);
(Continued)

(58) Field of Classification Search
None
See application file for complete search history.

(56) References Cited

U.S. PATENT DOCUMENTS 8,200,796 B1 6/2012 Margulis
10,169,066 B2 * 1/2019 Atsmon ................ B60W 50/06
(Continued)

FOREIGN PATENT DOCUMENTS

CN 101800730 A * 8/2010 ............. H04L 29/06
CN 107850634 A * 12/2015 ............. H04B 17/00
(Continued)

OTHER PUBLICATIONS citeseerx.ist.psu.edu [online], “Vsense: Virtualizing Stateful Sensors with Actuators,” Jul. 16, 2009, retrieved on Oct. 19, 2023, retrieved from URL <https://citeseerx.ist.psu.edu/documentrepid=repl&type=pdf&doi-b5d27161f4bf3404e6f84ce71a2f763caaf7475a>, 14 pages.
(Continued)

*Primary Examiner* — Charles E Anya
(74) *Attorney, Agent, or Firm* — Fish & Richardson P.C.

(57) ABSTRACT

A signal processing device includes: a processor configured to perform signal processing for a first display and a second display that are configured to be located in a vehicle. The processor is configured to execute first, second, and third virtual machines on a hypervisor in the processor, the second virtual machine is configured to be operated for the first display, and the third virtual machine is configured to be operated for the second display. The first virtual machine executed in the processor includes a first interface configured to receive sensor data from a sensor device in the vehicle and a radio signal from a tuner in the vehicle, and an input and output server interface configured to transmit, to at least one of the second virtual machine or the third virtual
(Continued)

machine, data corresponding to the sensor data or the radio signal received from the first interface.

18 Claims, 25 Drawing Sheets

(51) Int. Cl.

| | |
|---|---|
| ***B60K 35/21*** | (2024.01) |
| ***B60K 35/22*** | (2024.01) |
| ***B60K 35/29*** | (2024.01) |
| ***B60R 16/023*** | (2006.01) |
| ***G06F 3/14*** | (2006.01) |
| ***G06F 9/54*** | (2006.01) |
| ***G09G 5/14*** | (2006.01) |
| ***G09G 5/377*** | (2006.01) |

(52) U.S. Cl.

CPC ............ *B60K 35/29* (2024.01); *G06F 3/1423* (2013.01); *G06F 9/544* (2013.01); *B60K 35/00* (2013.01); *B60K 2360/18* (2024.01); *B60R 16/023* (2013.01); *G06F 3/1438* (2013.01); *G06F 3/1454* (2013.01); *G06F 2009/4557* (2013.01); *G06F 2009/45579* (2013.01); *G06F 2009/45583* (2013.01); *G06F 2009/45595* (2013.01); *G09G 5/14* (2013.01); *G09G 5/377* (2013.01); *G09G 2360/06* (2013.01); *G09G 2370/022* (2013.01); *G09G 2380/10* (2013.01)

(56) References Cited

U.S. PATENT DOCUMENTS

| | | | | |
|---|---|---|---|---|
| 11,403,148 | B2 | 8/2022 | Lenz et al. | |
| 11,544,028 | B2 | 1/2023 | Mues et al. | |
| 11,550,610 | B2 | 1/2023 | Goldmann et al. | |
| 11,755,355 | B2 | 9/2023 | McDaid et al. | |
| 12,067,428 | B2 | 8/2024 | Gurtovoy et al. | |
| 12,112,185 | B2 | 10/2024 | Kobayashi et al. | |
| 12,289,200 | B2 | 4/2025 | Mifsud et al. | |
| 2008/0320194 | A1* | 12/2008 | Vega | G06F 9/4812 710/263 |
| 2011/0022809 | A1 | 1/2011 | Satoh et al. | |
| 2011/0072426 | A1 | 3/2011 | Huang et al. | |
| 2011/0320823 | A1* | 12/2011 | Saroiu | H04L 9/3247 713/189 |
| 2012/0092277 | A1 | 4/2012 | Momchilov | |
| 2012/0198480 | A1* | 8/2012 | Yasaki | G06F 9/45533 719/319 |
| 2013/0031552 | A1 | 1/2013 | Kato | |
| 2014/0149490 | A1 | 5/2014 | Luxenberg et al. | |
| 2015/0012973 | A1* | 1/2015 | Derrin | H04L 63/102 726/4 |
| 2015/0015479 | A1* | 1/2015 | Cho | G06F 3/1423 345/156 |
| 2015/0178883 | A1 | 6/2015 | McKenzie et al. | |
| 2015/0205630 | A1 | 7/2015 | Hu et al. | |
| 2016/0034295 | A1 | 2/2016 | Cochran | |
| 2016/0328254 | A1 | 11/2016 | Ahmed et al. | |
| 2016/0359759 | A1* | 12/2016 | Singh | G06F 16/1748 |
| 2016/0364200 | A1 | 12/2016 | Beveridge et al. | |
| 2017/0039084 | A1 | 2/2017 | Atsmon et al. | |
| 2018/0204361 | A1 | 7/2018 | Tinsman | |
| 2019/0250408 | A1 | 8/2019 | Lafon et al. | |
| 2019/0258251 | A1 | 8/2019 | Ditty et al. | |
| 2019/0379683 | A1* | 12/2019 | Overby | G06F 9/45533 |
| 2020/0026546 | A1 | 1/2020 | Lee et al. | |
| 2020/0117495 | A1 | 4/2020 | Samii et al. | |
| 2020/0159562 | A1 | 5/2020 | Lee et al. | |
| 2020/0192722 | A1 | 6/2020 | Lenz et al. | |
| 2020/0218443 | A1 | 7/2020 | Narayan et al. | |
| 2020/0219322 | A1 | 7/2020 | Verma et al. | |
| 2020/0219469 | A1 | 7/2020 | Mittal et al. | |
| 2020/0293357 | A1 | 9/2020 | Goldmann et al. | |
| 2020/0326898 | A1 | 10/2020 | Mues et al. | |
| 2020/0326968 | A1 | 10/2020 | Hayes et al. | |
| 2020/0326969 | A1* | 10/2020 | Hayes | G06F 11/2028 |
| 2021/0219002 | A1* | 7/2021 | Barnes | B64D 11/00155 |
| 2021/0240512 | A1 | 8/2021 | Onda et al. | |
| 2021/0264559 | A1 | 8/2021 | Roper et al. | |
| 2022/0308910 | A1 | 9/2022 | Rottkamp | |
| 2023/0333552 | A1 | 10/2023 | Duguid et al. | |

FOREIGN PATENT DOCUMENTS

| | | | | | |
|---|---|---|---|---|---|
| CN | 103856547 | A | * | 7/2017 | G06F 3/1423 |
| CN | 107077577 | A | * | 8/2017 | G06F 9/485 |
| EP | 3470980 | A1 | * | 4/2019 | G06F 9/4887 |
| JP | 2017-507401 | A | | 3/2017 | |
| JP | 6523298 | B2 | * | 5/2019 | G06F 9/455 |
| KR | 10-2011-0056843 | | | 5/2011 | |
| KR | 10-2011-0088930 | | | 8/2011 | |
| KR | 10-2014-0000328 | | | 1/2014 | |
| KR | 2020-0058157 | A | * | 5/2020 | G06F 13/14 |
| WO | WO 2015/103376 | | | 7/2015 | |
| WO | WO-2015103374 | A1 | * | 7/2015 | G06F 9/4881 |

OTHER PUBLICATIONS

Extended European Search Report in European Appln. No. 22715510.8, mailed on Oct. 30, 2023, 9 pages.

mobt3ath.com [online], “The Definitive Guide to the Xen Hypervisor,” Jan. 1, 2008, retrieved on Sep. 7, 2020, retrieved from URL<https://www.mobt3ath.com/uplode/book/book-55475.pdf>, 307 pages.

Office Action in U.S. Appl. No. 17/771,450, mailed on Dec. 20, 2024, 58 pages.

Extended European Search Report in European Appln. No. 21878752.1, mailed on Feb. 2, 2024, 8 pages.

International Search Report and Written Opinion in Appln. No. PCT/KR2021/014950, mailed on Feb. 17, 2022, 6 pages (with English translation).

Mounir et al., “Hardware-Assisted Virtualization for Heterogeneous Automotive Applications,” Paper, Presented at the 2019 14th International Conference on Computer Engineering and Systems (ICCES), Cairo, Egypt, Dec. 17, 2019, pp. 195-200.

Office Action in U.S. Appl. No. 17/755,046, mailed on Mar. 17, 2025, 43 pages.

Office Action in U.S. Appl. No. 17/771,450, mailed on May 8, 2025, 8 pages.

Office Action in U.S. Appl. No. 17/755,046, mailed on Aug. 6, 2025, 47 pages.

Office Action in U.S. Appl. No. 17/755,046, mailed on Jan. 9, 2026, 53 pages.

Office Action in U.S. Appl. No. 18/278,334, mailed on Nov. 28, 2025, 18 pages.

Office Action in Korean Appln. No. 10-2023-7031948, mailed on Apr. 21, 2026, 16 pages (with English translation).

Office Action in U.S. Appl. No. 17/755,046, mailed on Jun. 12, 2026, 53 pages.

* cited by examiner

100

100

100

100

100

100

SIGNAL PROCESSING DEVICE AND DISPLAY APPARATUS FOR VEHICLE INCLUDING THE SAME

CROSS-REFERENCE TO RELATED APPLICATIONS

This application is a National Stage application under 35 U.S.C. § 371 of International Application No. PCT/KR2021/020056, filed on Dec. 28, 2021, which claims the benefit of Korean Patent Application No. 10-2021-0026453, filed on Feb. 26, 2021, and Korean Patent Application No. 10-2021-0053004, filed on Apr. 23, 2021. The disclosures of the prior applications are incorporated by reference in their entirety.

TECHNICAL FIELD

The present disclosure relates to a signal processing device and a display apparatus for vehicle including the same, and more particularly, to a signal processing device capable of rapidly receiving and processing sensor data and a display apparatus for vehicle including the same.

BACKGROUND

A vehicle is an apparatus that a driver moves in a desired direction. A representative example of the vehicle is a car.

In some implementations, a display apparatus for vehicle is located in the vehicle for convenience of users who use the vehicle.

For example, a display is disposed in a cluster in order to display various kinds of information. By way of further example, in order to display vehicle driving information, various displays, such as an audio video navigation (AVN) display, are located in the vehicle, in addition to the cluster.

In the case in which the number of displays in the display apparatus for vehicle is increased, however, signal processing for the displays is complicated.

IA conventional vehicle can have a disadvantage that, when various devices in the vehicle transmits data to a controller of the vehicle, considerable transmission time is taken and device-specific synchronization can be very difficult.

SUMMARY

The present disclosure is directed to a signal processing device capable of rapidly receiving and processing sensor data and a display apparatus for vehicle including the same.

The present disclosure is also directed to a signal processing device capable of rapidly sharing sensor data even though the number of virtual machines is increased or the number of displays is increased and a display apparatus for vehicle including the same.

The present disclosure is also directed to a signal processing device capable of rapidly and accurately processing touch input and a display apparatus for vehicle including the same.

The present disclosure is also directed to provide a signal processing device capable of rapidly and accurately processing touch input even though the number of virtual machines is increased and a display apparatus for vehicle including the same.

The present disclosure is also directed to a signal processing device capable of rapidly and accurately processing touch input even though operating systems of a plurality of virtual machines are different from each other and a display apparatus for vehicle including the same.

According to one aspect of the subject matter described in this application, a signal processing device can include a processor configured to perform signal processing for a first display and a second display that are configured to be located in a vehicle. The processor can be configured to execute first, second, and third virtual machines on a hypervisor in the processor, the second virtual machine can be configured to be operated for the first display, and the third virtual machine can be configured to be operated for the second display. The first virtual machine executed in the processor can include a first interface configured to receive sensor data from a sensor device in the vehicle and a radio signal from a tuner in the vehicle, and an input and output server interface configured to transmit, to at least one of the second virtual machine or the third virtual machine, data corresponding to the sensor data or the radio signal received from the first interface.

Implementations according to this aspect can include one or more of the following features. For example, the second virtual machine and the third virtual machine can include input and output client interfaces configured to receive the data corresponding to the sensor data or the radio signal from the first interface.

In some implementations, only the first virtual machine among the first, second, and third virtual machines is configured to perform data communication with the sensor device and the tuner in the vehicle. In some implementations, the first virtual machine can be configured to store the data corresponding to the sensor data or the radio signal in a shared memory, and at least one of the second virtual machine or the third virtual machine can be configured to receive the data corresponding to the sensor data or the radio signal stored in the shared memory.

In some examples, the first virtual machine can be configured to transmit, to the second virtual machine or the third virtual machine, a buffer index regarding the shared memory in which the data corresponding to the sensor data or the radio signal are stored, and the second virtual machine or the third virtual machine can be configured to read the data corresponding to the sensor data or the radio signal stored in the shared memory based on the received buffer index. In some implementations, the first virtual machine can be configured to receive and process wheel speed sensor data of the vehicle through the first interface, and transmit, to at least one of the second virtual machine or the third virtual machine through the input and output server interface, the processed wheel speed sensor data.

In some implementations, the first virtual machine can be configured to receive, through the first interface, air conditioning data of the vehicle, process the received air conditioning data, and transmit, to at least one of the second virtual machine or the third virtual machine through the input and output server interface, the processed air conditioning data. In some implementations, the first virtual machine can be configured to perform (i) a supervisory service for system and display management of the vehicle and (ii) a system service for external device connection control and vehicle information management.

In some examples, the first interface can be configured to receive, from the sensor device, the sensor data through controller area network (CAN) communication, and the first interface can be configured to receive data through an universal serial bus (USB) or a short range wireless technology communication. In some examples, the first virtual machine can be configured to receive touch input to the first display or the second display, and transmit, to the second virtual machine or the third virtual machine, information regarding the touch input.

In some implementations, only the first virtual machine among the first, second, and third virtual machines can be configured to receive the touch input. In some implementations, the information regarding the touch input can include coordinate information of the touch input. In some implementations, the first virtual machine can be configured to, based on the touch input corresponding to an overlay provided by the third virtual machine among a plurality of overlays displayed on the first display, transmit the information regarding the touch input only to the third virtual machine among the second virtual machine and the third virtual machine.

In some implementations, the first virtual machine can be configured to, based on the touch input corresponding to an overlay provided by the second virtual machine among a plurality of overlays displayed on the first display, transmit the information regarding the touch input to the second virtual machine. In some examples, the first virtual machine can be configured to store the coordinate information of the touch input in a shared memory. In some examples, the first virtual machine can be configured to transmit a buffer index regarding the shared memory to the second virtual machine or the third virtual machine, and the second virtual machine or the third virtual machine can be configured to read the coordinate information of the touch input from the shared memory based on the received buffer index.

In some implementations, the input and output server interface can be configured to receive, from input and output client interfaces in the second virtual machine and the third virtual machine, a request for transmission of first data and transmit a request for allocation of a shared memory to a security manager executed in the first virtual machine, and the security manager can be configured to allocate the shared memory using the hypervisor and write the first data in the shared memory.

According to another aspect of the subject matter described in this application, a signal processing device can include a processor configured to perform signal processing for a first display and a second display configured to be located in a vehicle. The processor can be configured to execute first, second, and third virtual machines on a hypervisor in the processor, the second virtual machine can be configured to be operated for the first display, and the third virtual machine can be configured to be operated for the second display. The first virtual machine can include a first interface configured to receive controller area network (CAN) communication data and a radio signal from a tuner in the vehicle, and an input and output server interface configured to transmit, to at least one of the second virtual machine or the third virtual machine, data corresponding to the CAN communication data or the radio signal received from the first interface.

Implementations according to this aspect can include one or more of the following features. For example, the first virtual machine can be configured to receive and process wheel speed sensor data of the vehicle included in the CAN communication data, and transmit, to at least one of the second virtual machine or the third virtual machine, the processed wheel speed sensor data.

According to another aspect of the subject matter described in this application, a display apparatus for a vehicle can include a first display, a second display, and a signal processing device comprising a processor configured to perform signal processing for the first display and the second display. The processor can be configured to execute first, second, and third virtual machines on a hypervisor in the processor, the second virtual machine can be configured to be operated for the first display, and the third virtual machine can be configured to be operated for the second display. The first virtual machine in the processor can include a first interface configured to receive sensor data from a sensor device in the vehicle and a radio signal from a tuner in the vehicle, and an input and output server interface configured to transmit, to at least one of the second virtual machine or the third virtual machine, data corresponding to the sensor data or the radio signal received from the first interface.

DETAILED DESCRIPTION

Figure 1A:
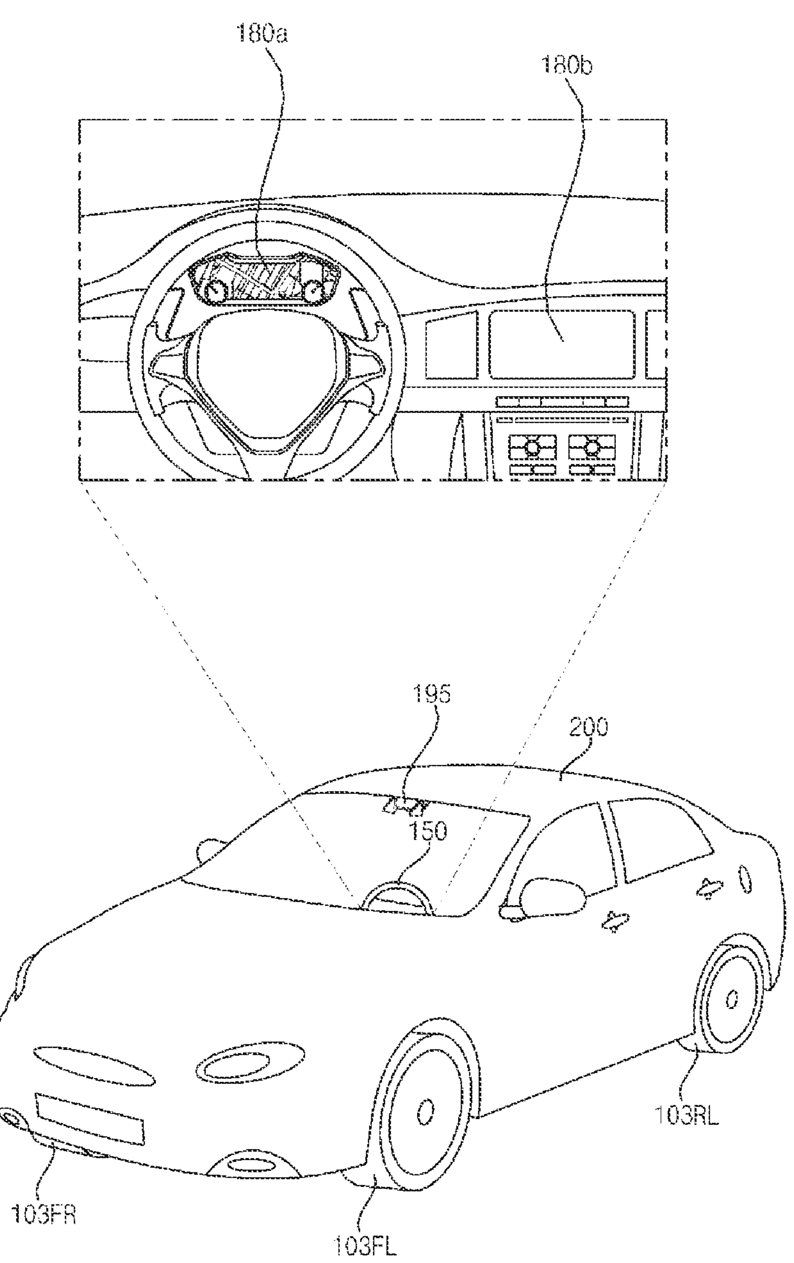
FIG. 1A is a diagram illustrating an example of the exterior and interior of a vehicle.

FIG. 1A is a diagram illustrating an example of the exterior and interior of a vehicle.

Referring to the figure, the vehicle 200 can be moved by a plurality of wheels 103FR, 103FL, 103RL, . . . rotated by a power source and a steering wheel 150 configured to adjust an advancing direction of the vehicle 200.

In some implementations, the vehicle 200 can be provided with a camera 195 configured to acquire an image of the front of the vehicle.

In some implementations, the vehicle 200 can be further provided therein with a plurality of displays 180*a* and 180*b* configured to display images and information.

In FIG. 1A, a cluster display 180*a* and an audio video navigation (AVN) display 180*b* are illustrated as the plurality of displays 180*a* and 180*b*. In addition, a head up display (HUD) can also be used.

In some implementations, the audio video navigation (AVN) display 180*b* can also be called a center information display.

In some implementations, the vehicle 200 described in this specification can be a concept including all of a vehicle having an engine as a power source, a hybrid vehicle having an engine and an electric motor as a power source, and an electric vehicle having an electric motor as a power source.

Figure 1B:
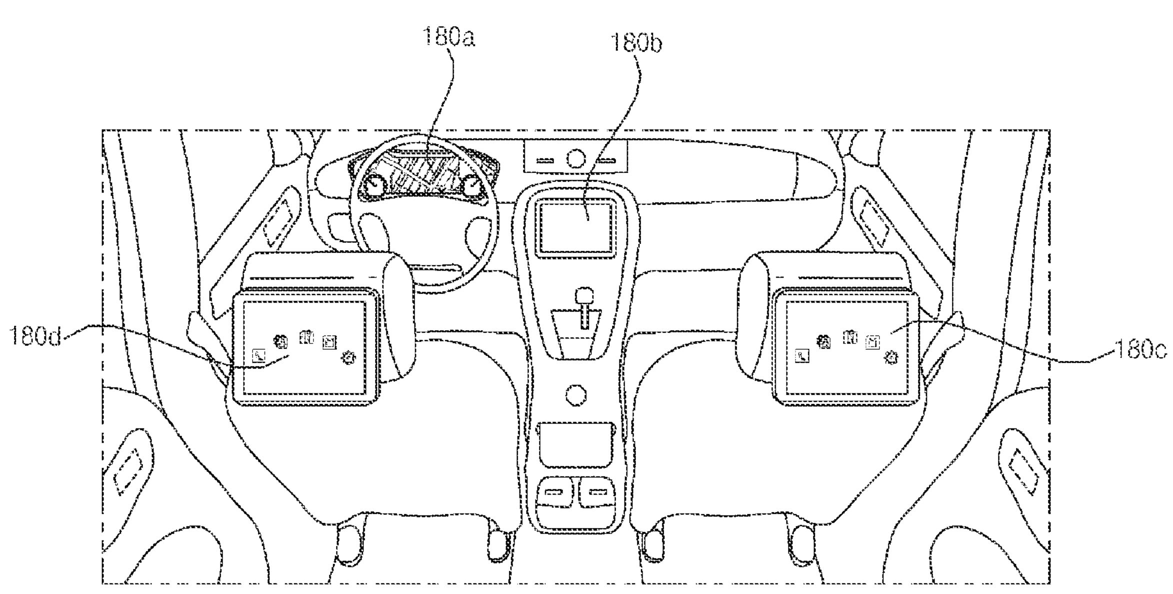
FIG. 1B is a diagram illustrating another example of the interior of the vehicle.

FIG. 1B is a diagram illustrating another example of the interior of the vehicle.

Referring to the figure, a cluster display 180*a*, an audio video navigation (AVN) display 180*b*, rear seat entertainment displays 180*c* and 180*d*, and a rear-view mirror display can be located in the vehicle.

The present disclosure proposes a scheme for a display apparatus 100 for vehicle including a plurality of displays 180*a* to 180*d* to rapidly and accurately process touch input. This will be described with reference to FIG. 5 and subsequent figures.

Figure 2:
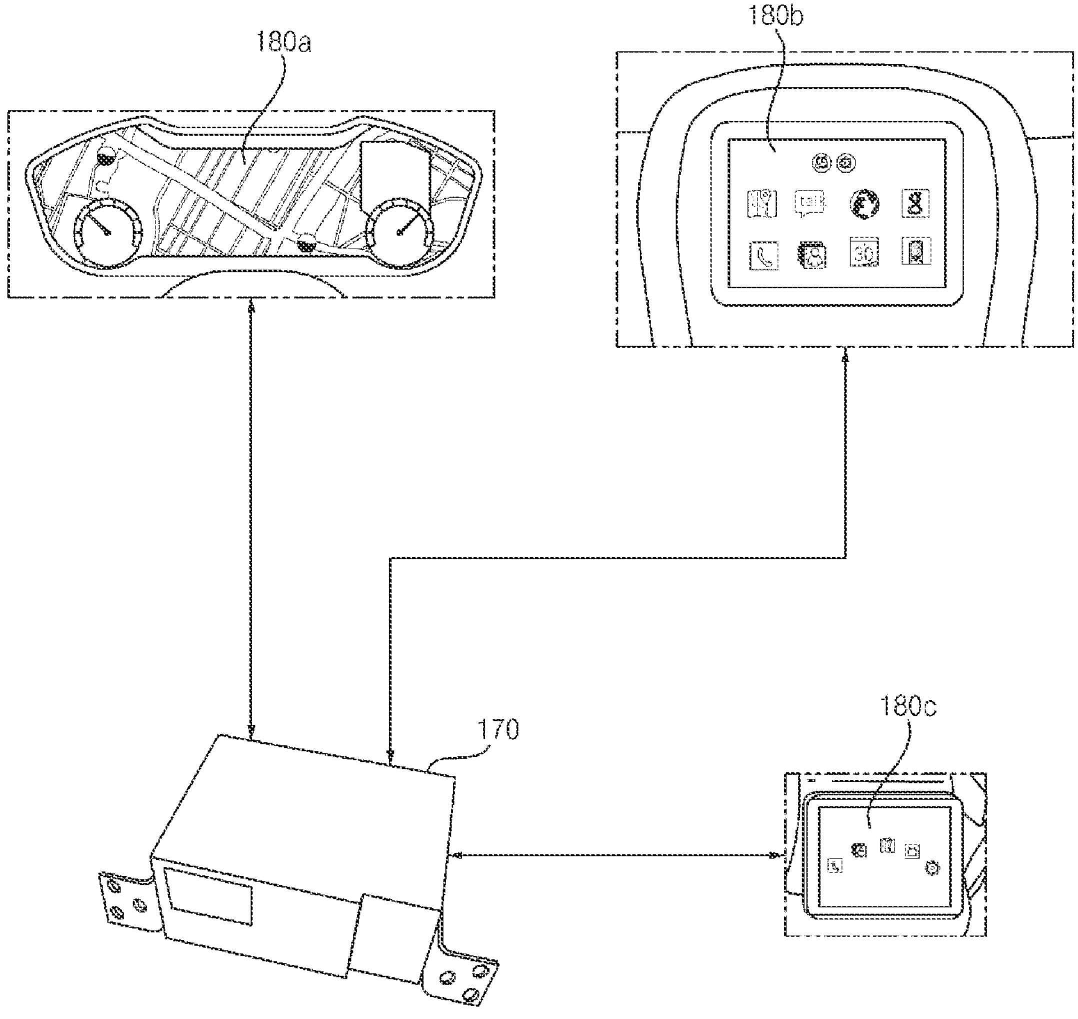
FIG. 2 is a diagram illustrating an example of an external appearance of a display apparatus for vehicle.

FIG. 2 is a diagram illustrating the external appearance of a display apparatus.

The display apparatus 100 for vehicle can include a plurality of displays 180*a* and 180*b* and a signal processing device 170 configured to perform signal processing to display images and information on the plurality of displays 180*a* and 180*b*.

The first display 180*a*, which is one of the plurality of displays 180*a* and 180*b*, can be a cluster display 180*a* configured to display a driving state and operation information, and the second display 180*b* can be an audio video navigation (AVN) display 180*b* configured to display vehicle driving information, a navigation map, various kinds of entertainment information, or an image.

The signal processing device 170 can have a processor 175 provided therein, and first to third virtual machines 520 to 540 can be executed by a hypervisor 505 in the processor 175.

The second virtual machine 530 can be operated for the first display 180*a*, and the third virtual machine 540 can be operated for the second display 180*b*.

In some implementations, the first virtual machine 520 in the processor 175 receives sensor data from a sensor device 760 in the vehicle 200 and a radio signal from a tuner 105 in the vehicle 200, and transmits data corresponding to the received sensor data or radio signal to at least one of the second virtual machine 530 or the third virtual machine 540. Consequently, the sensor data can be rapidly received and processed. In particular, the sensor data can be rapidly shared even though the number of virtual machines is increased or the number of displays is increased. Furthermore, the sensor data can be rapidly shared even though operating systems of the plurality of virtual machines are different from each other.

In some implementations, the first virtual machine 520 in the processor 175 can be configured to set a shared memory 508 based on the hypervisor 505 for transmission of the same data to the second virtual machine 530 and the third virtual machine 540. Consequently, the first display 180*a* and the second display 180*b* in the vehicle can display the same information or the same images in a synchronized state.

In some implementations, the first virtual machine 520 in the processor 175 shares at least some of data with the second virtual machine 530 and the third virtual machine 540 for divided processing of data. Consequently, the plurality of virtual machines for the plurality of displays in the vehicle can divide and process data.

In some implementations, the first virtual machine 520 in the processor 175 can receive and process wheel speed sensor data of the vehicle, and can transmit the processed wheel speed sensor data to at least one of the second virtual machine 530 or the third virtual machine 540. Consequently, at least one virtual machine can share the wheel speed sensor data of the vehicle.

In some implementations, the display apparatus 100 for vehicle can further include a rear seat entertainment (RSE) display 180*c* configured to display driving state information, simple navigation information, various kinds of entertainment information, or an image.

The signal processing device 170 can further execute a fourth virtual machine, in addition to the first to third virtual machines 520 to 540, on the hypervisor 505 in the processor 175 to control the RSE display 180*c*.

Consequently, various displays 180*a* to 180*c* can be controlled using a single signal processing device 170.

In some implementations, some of the plurality of displays 180*a* to 180*c* can be operated based on a Linux Operating System (OS), and others can be operated based on a Web Operating System (OS).

In response to touch being input to any one of the displays 180*a* and 180*b* or 180*a* to 180*c* configured to be operated under various operating systems, the signal processing device 170 can be configured to rapidly and accurately process the touch input.

Figure 10A:
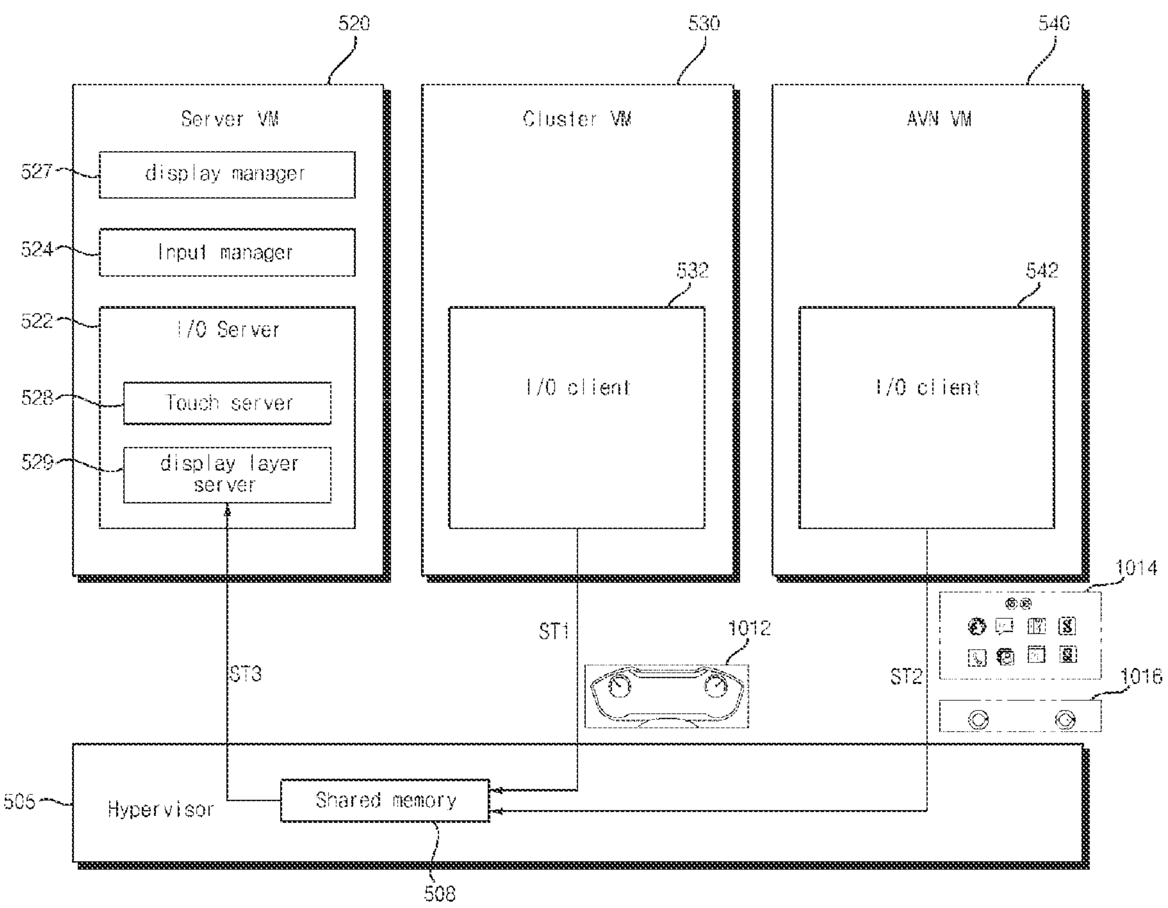
FIGS. 10A-C, 11A-D, 12A-C, and 13A-D are diagrams referred to in the description of FIGS. 5 to 7.
Figure 10B:
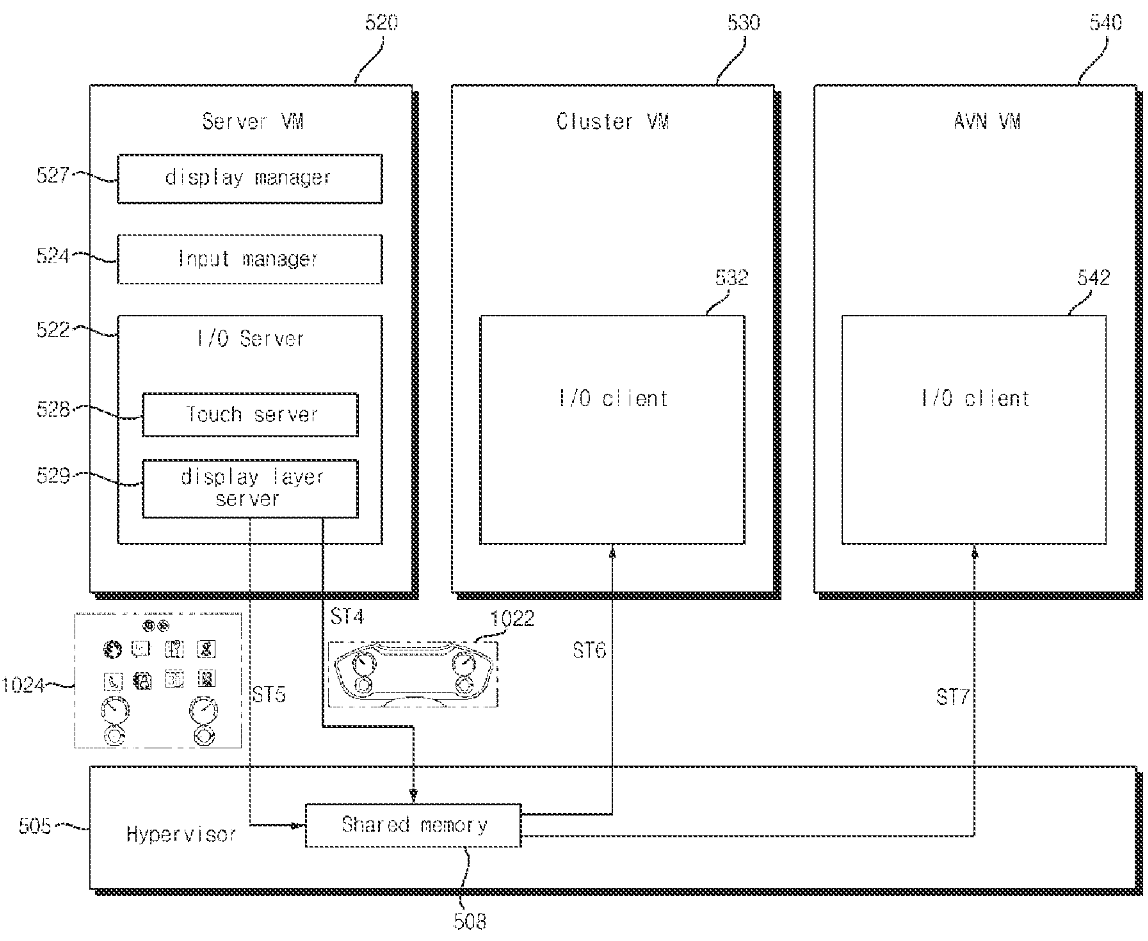
Figure 10C:
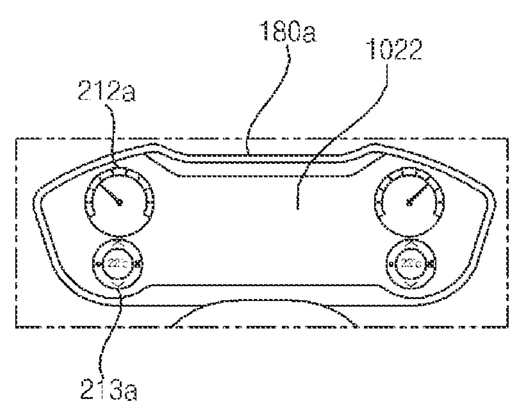
Figure 10C:
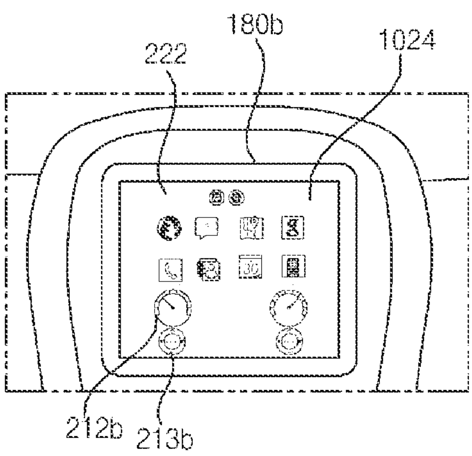
Figure 11A:
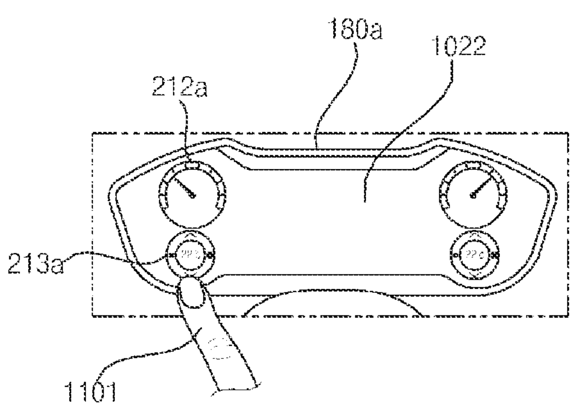
Figure 11A:
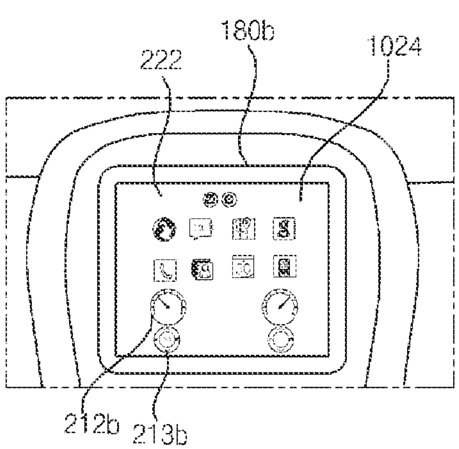

In some implementations, as depicted in FIGS. 10C and 11A, a vehicle speed indicator 212*a* and an in-vehicle temperature indicator 213*a* can be displayed on the first display 180*a*, a home screen 222 including a plurality of applications, a vehicle speed indicator 212*b*, and an in-vehicle temperature indicator 213*b* can be displayed on the second display 180*b*, and a home screen 222*b* including a plurality of applications and an in-vehicle temperature indicator 213*c* can be displayed on the third display 180*c*.

Figure 3:
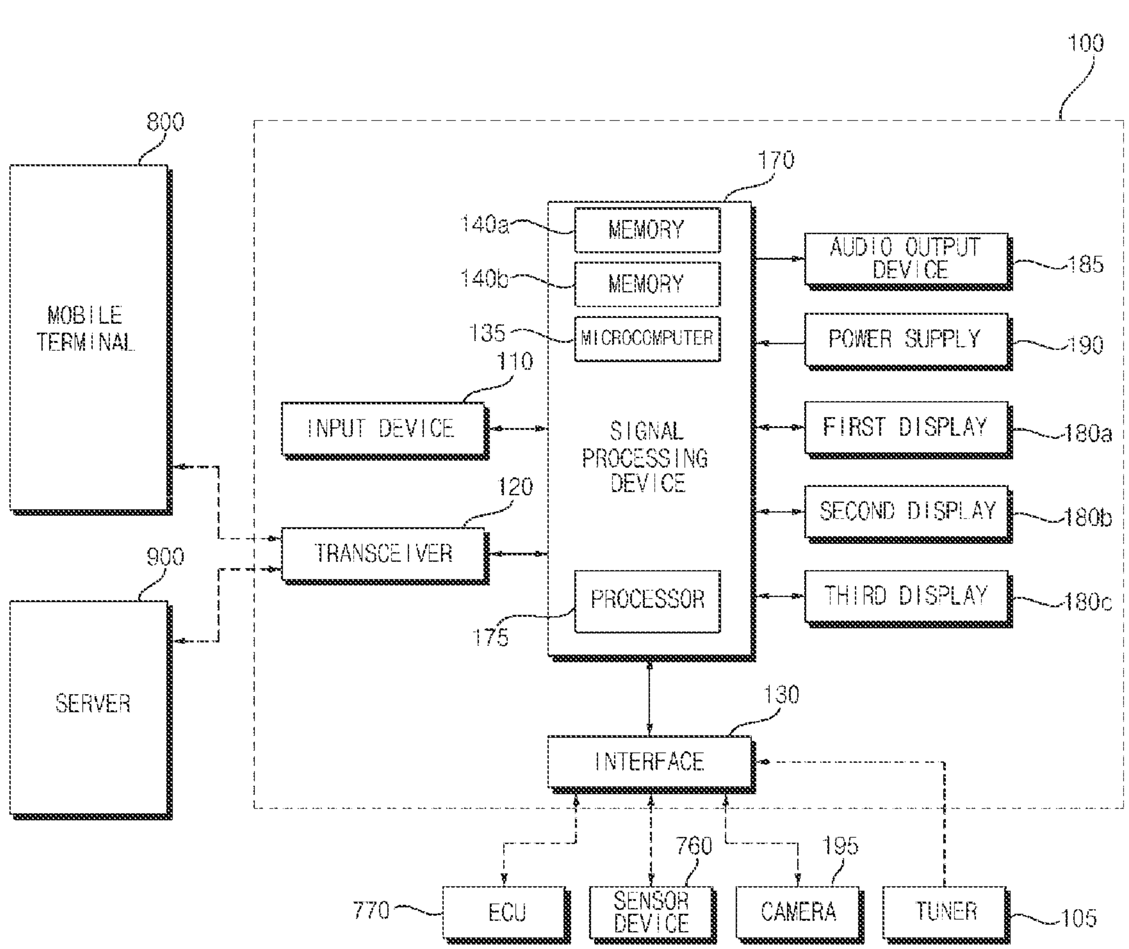
FIG. 3 is a diagram illustrating an example of an internal block diagram of the display apparatus for vehicle of FIG. 2.

FIG. 3 is a diagram illustrating an example of an internal block diagram of the display apparatus for vehicle.

Referring to the figure, the display apparatus 100 for vehicle can include an input device 110, a transceiver 120, an interface 130, a signal processing device 170, a plurality of displays 180*a* to 180*c*, an audio output device 185, and a power supply 190.

The input device 110 can include a physical button or pad for button input or touch input.

In some implementations, the input device 110 can include a touch sensor configured to sense touch input to the displays 180*a*, 180*b*, and 180*c*.

In some implementations, the input device 110 can include a microphone configured to receive user voice.

The transceiver 120 can wirelessly exchange data with a mobile terminal 800 or a server 900.

In particular, the transceiver 120 can wirelessly exchange data with a mobile terminal of a vehicle driver. Any of various data communication schemes, such as Bluetooth, Wi-Fi, WIFI Direct, and APIX, can be used as a wireless data communication scheme.

The transceiver 120 can receive weather information and road traffic situation information, such as transport protocol expert group (TPEG) information, from the mobile terminal 800 or the server 900. For example, the transceiver 120 can include a mobile communication module.

The interface 130 can receive sensor information from an electronic control unit (ECU) 770 or a sensor device 760, and can transmit the received information to the signal processing device 170.

Here, the sensor information can include at least one of vehicle direction information, vehicle position information (global positioning system (GPS) information), vehicle angle information, vehicle velocity information, vehicle acceleration information, vehicle inclination information, vehicle forward/backward movement information, battery information, fuel information, tire information, vehicle lamp information, in-vehicle temperature information, or in-vehicle humidity information.

The sensor information can be acquired from a heading sensor, a yaw sensor, a gyro sensor, a position sensor, a vehicle forward/backward movement sensor, a wheel sensor, a vehicle velocity sensor, a car body inclination sensor, a battery sensor, a fuel sensor, a tire sensor, a steering-wheel-rotation-based steering sensor, an in-vehicle temperature sensor, or an in-vehicle humidity sensor. In some implementations, the position module can include a GPS module configured to receive GPS information.

In some implementations, the interface 130 can receive front-of-vehicle image data, side-of-vehicle image data, rear-of-vehicle image data, and obstacle-around-vehicle distance information from a camera 195 or lidar, and can transmit the received information to the signal processing device 170.

The audio output device 185 can convert an electrical signal from the signal processing device 170 into an audio signal, and can output the audio signal. To this end, the audio output device 185 can include a speaker.

The power supply 190 can supply power necessary to operate components under control of the signal processing device 170. In particular, the power supply 190 can receive power from a battery in the vehicle.

The signal processing device 170 can control overall operation of each device in the display apparatus 100 for vehicle.

In some implementations, the signal processing device 170 can be implemented in the form of a system on chip (SOC).

The signal processing device 170 can include a processor 175 configured to perform signal processing for the displays 180*a*, 180*b*, and 180*c*, a first memory 140*a* and a second memory 140*b* configured to store various data, and a microcomputer 135.

The first memory 140*a*, which is a nonvolatile memory, can store various data even in a standby mode or when power is off.

For example, the first memory 140*a* can store a file corresponding to a first application executed by any one of a plurality of virtual machines 510 to 550 based on entry into the standby mode.

As another example, the first memory 140*a* can store an operating system (OS).

In some implementations, the first memory 140*a* can store various data for overall operation of the display apparatus 100 for vehicle, such as programs for processing or control of the signal processing device 170.

In some implementations, the second memory 140*b*, which is a volatile memory, can erase various data in the standby mode or when power is off, and can temporarily store data in an active mode.

For example, the second memory 140*b* can load the file stored in the first memory 140*a* based on switching from the standby mode to the active mode.

As another example, the second memory 140*b* can load the operating system (OS) stored in the first memory 140*a* based on switching from the standby mode to the active mode.

Figure 5:
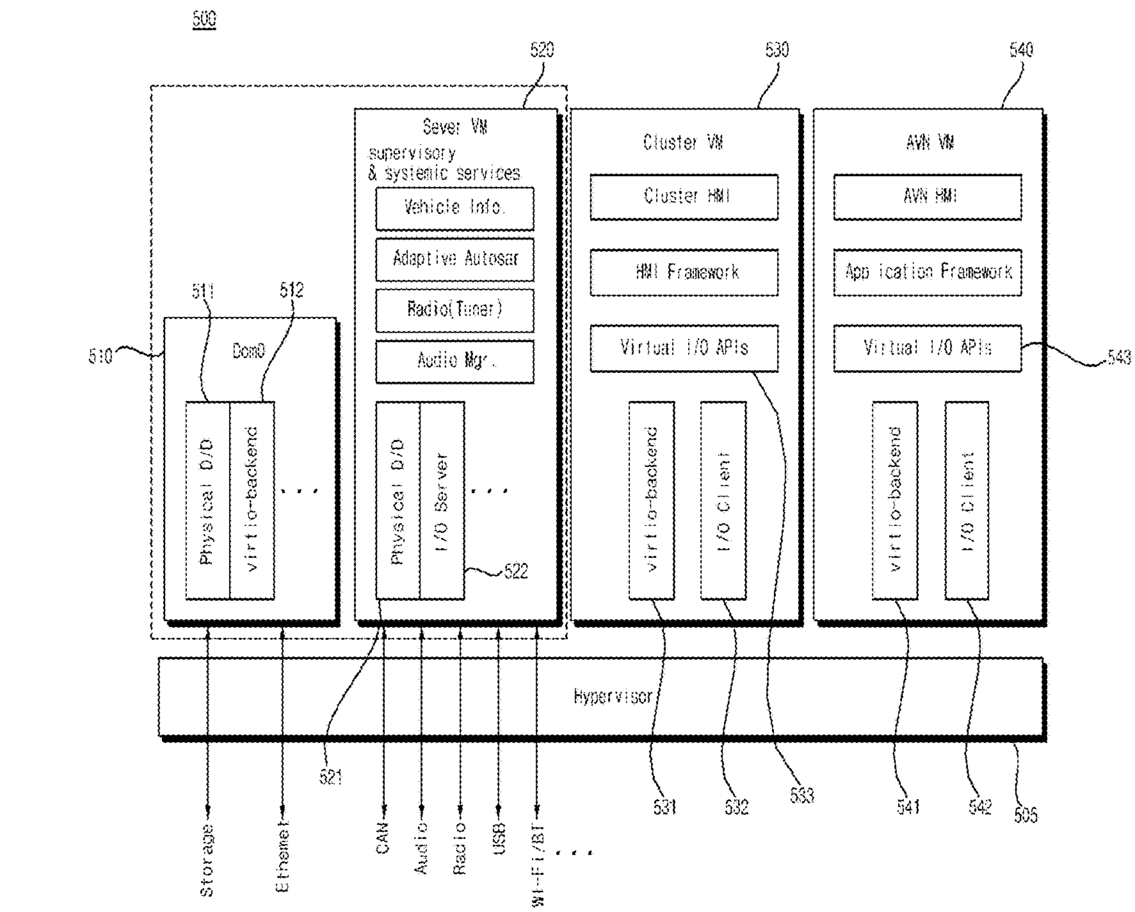
FIG. 5 is a diagram illustrating another example of a system driven in a signal processing device.

In some implementations, the processor 175 can drive the hypervisor 505 (see FIG. 5).

In some implementations, the processor 175 can execute the first to fourth virtual machines 520 to 550 on the hypervisor 505 (see FIG. 5) in the processor 175.

In some implementations, the processor 175 can further execute a legacy virtual machine 510 configured to receive and process Ethernet data. For example, as shown in FIG. 5, the legacy virtual machine 510 can be executed by the first virtual machine 520 in the processor 175.

Among the first to fourth virtual machines 520 to 550 (see FIG. 5), the first virtual machine 520 can be called a server virtual machine, and the second to fourth virtual machines 530 to 550 can be called guest virtual machines.

The second virtual machine 530 can be operated for the first display 180*a*, the third virtual machine 540 can be operated for the second display 180*b*, and the fourth virtual machine 550 can be operated for the third display 180*c*.

For example, the first virtual machine 520 executed in the processor 175 can receive, process, and output vehicle sensor data, position information data, camera image data, audio data, or touch input data. Data processed only by a legacy virtual machine and data processed by the first virtual machine 520 can be distinguished from each other, whereby data processing can be efficiently performed. In particular, the first virtual machine 520 can process most of the data, whereby 1:N data sharing can be achieved.

As another example, the first virtual machine 520 can directly receive and process controller area network (CAN) communication data, audio data, radio data, universal serial bus (USB) data, and wireless communication data for the second to fourth virtual machines 530 to 550.

The first virtual machine 520 can transmit the processed data to the second to fourth virtual machines 530 to 550.

Consequently, only the first virtual machine 520, among the first to fourth virtual machines 520 to 550, can receive communication data and external input data, and can perform signal processing, whereby load in signal processing by the other virtual machines can be reduced and 1:N data communication can be achieved, and therefore synchronization at the time of data sharing can be achieved.

In some implementations, the first virtual machine 520 writes some of data in a first shared memory to be transmitted to the second virtual machine 530, and writes some other of data in the first shared memory to be transmitted to the third virtual machine 540. The second virtual machine 530 and the third virtual machine 540 are configured to process the received data, and write the processed data in a second shared memory.

In some implementations, data can be any one of image data, audio data, navigation data, and voice recognition data.

In some implementations, the first virtual machine 520 can process some other of data, and can be configured to write the processed data in the second shared memory. For example, the first virtual machine 520 can perform data processing in addition to the second virtual machine 530 and the third virtual machine 540.

In some implementations, in response to a fourth virtual machine 550 configured to be operated for the third display 180*c* being executed in the processor 175, the first virtual machine 520 can write some other of data in the first shared memory, and the fourth virtual machine 550 can process the received data and can be configured to write the processed data in the second shared memory.

In some implementations, the first virtual machine 520 can generate command queues for distributed processing of data in the second virtual machine 530 to the fourth virtual machine 550. Consequently, the plurality of virtual machines can divide and process data.

In some implementations, in response to the second virtual machine 530 to the fourth virtual machine 550 sharing the same data, the first virtual machine 520 in the processor 175 can generate one command queue. Consequently, the same data can be synchronized and shared.

In some implementations, the first virtual machine 520 can generate command queues corresponding to the number of virtual machines for distributed processing of data.

In some implementations, the first virtual machine 520 can be configured to transmit at least some of data to at least one of the second virtual machine 530 to the fourth virtual machine 550 for distributed processing of data.

For example, the first virtual machine 520 can allocate the first shared memory for transmitting at least some of data to at least one of the second virtual machine 530 to the fourth virtual machine 550, and image data processed by the second virtual machine 530 or the third virtual machine 540 can be written in the second shared memory.

In some implementations, the first virtual machine 520 can be configured to write data in the shared memory 508, whereby the second virtual machine 530 to the fourth virtual machine 550 share the same data.

For example, the first virtual machine 520 can be configured to write radio data or wireless communication data in the shared memory 508, whereby the second virtual machine 530 to the fourth virtual machine 550 share the same data. Consequently, 1:N data sharing can be achieved.

In some implementations, the first virtual machine 520 can process most of the data, whereby 1:N data sharing can be achieved.

In some implementations, the first virtual machine 520 in the processor 175 can be configured to set the shared memory 508 based on the hypervisor 505 to transmit the same data to the second, third, and fourth virtual machines 530-550.

For example, the first virtual machine 520 in the processor 175 can transmit the same data to the second, third, and fourth virtual machines 530-550 in a synchronized state using the shared memory 508 based on the hypervisor 505. Consequently, the plurality of displays 180*a* to 180*c* in the vehicle can display the same images in a synchronized state.

In some implementations, the signal processing device 170 can process various signals, such as an audio signal, an image signal, and a data signal.

In some implementations, the first virtual machine 520 in the processor 175 can receive sensor data from the sensor device 760 in the vehicle 200 and a radio signal from the tuner 105 in the vehicle 200, and can transmit data corresponding to the sensor data or the radio signal to at least one of the second virtual machine 530 or the third virtual machine 540. Consequently, the data corresponding to the sensor data or the radio signal can be rapidly shared.

Figure 4:
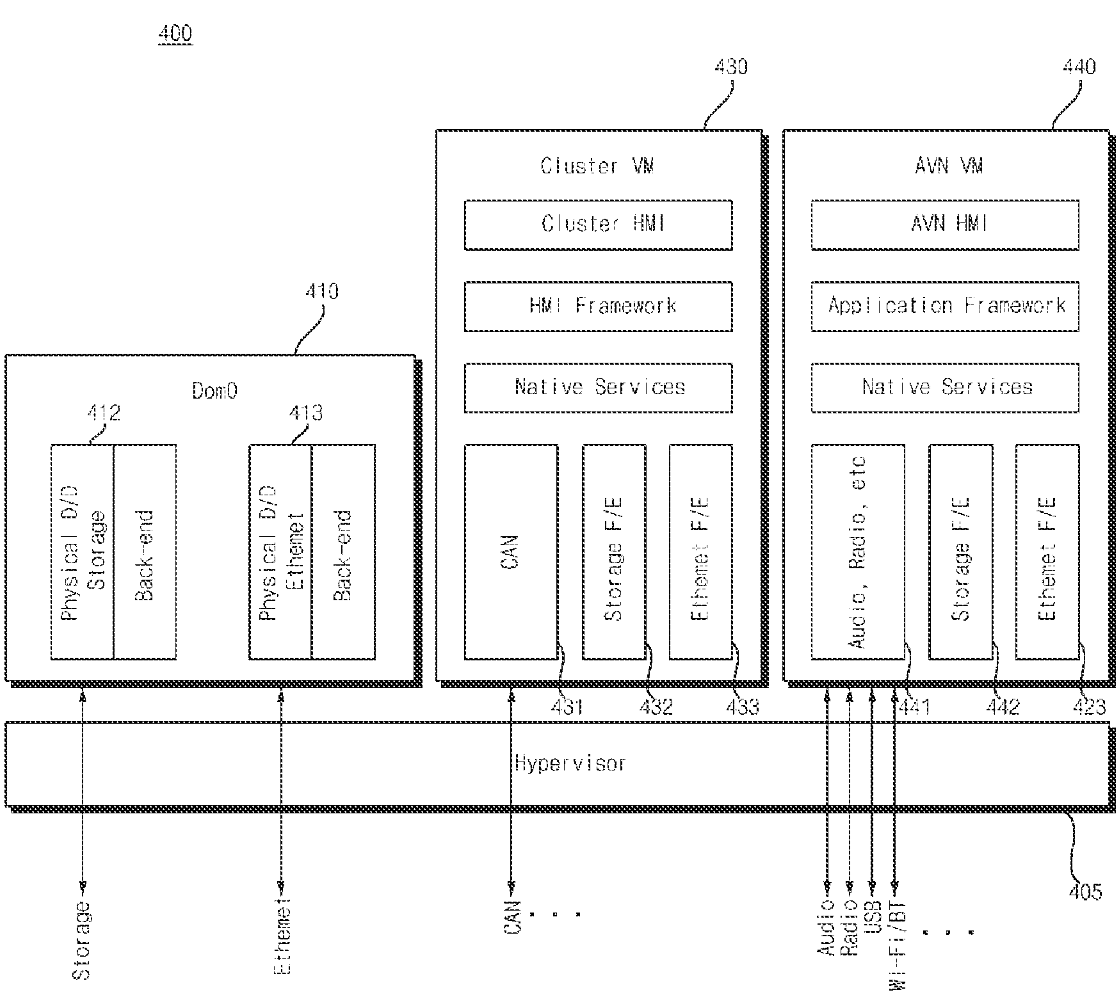
FIG. 4 is a diagram illustrating an example of a system driven in a signal processing device.

FIG. 4 is a diagram illustrating an example of a system driven in a signal processing device.

Referring to the figure, FIG. 4 is a diagram illustrating that virtual machines are used for the cluster display 180*a* and the AVN display 180*b*.

The system 400 driven in the signal processing device of FIG. 4 illustrates that a cluster virtual machine 430 and an AVN virtual machine 440 can be executed through a hypervisor 405 in the processor 175.

In some implementations, as depicted in FIG. 4, a legacy virtual machine 410 can also be executed on the hypervisor 405 in the processor 175.

The legacy virtual machine 410 can include an interface 412 for data communication with the memory 140 and an interface 413 for Ethernet communication.

In some implementations, the cluster virtual machine 430 can include an interface 431 for CAN communication, an interface 432 for communication with the interface 412 of the legacy virtual machine 410, and an interface 433 for communication with the interface 413 of the legacy virtual machine 410.

In some implementations, the AVN virtual machine 440 can include an interface 441 for input and output of audio data, radio data, USB data, and wireless communication data, an interface 442 for communication with the interface 412 of the legacy virtual machine 410, and an interface 443 for communication with the interface 413 of the legacy virtual machine 410.

In the system 400, there may be a disadvantage in that CAN communication data are input and output only in the cluster virtual machine 430, whereby the CAN communication data cannot be utilized in the AVN virtual machine 440.

Also, in the system 400 of FIG. 4, there may be a disadvantage in that audio data, radio data, USB data, and wireless communication data are input and output only in the AVN virtual machine 440, whereby these data cannot be utilized in the cluster virtual machine 430.

In addition, there may be a disadvantage in that the cluster virtual machine 430 and the AVN virtual machine 440 must include the interfaces 431 and 432 and the interfaces 441 and 442, respectively, for memory data and Ethernet communication data input and output in the legacy virtual machine 410.

Therefore, the present disclosure proposes a scheme for improving the system of FIG. 4. For example, virtual machines can be classified into a server virtual machine and guest virtual machines for inputting and outputting various memory data and communication data not in the guest virtual machines but in the server virtual machine. This will be described with reference to FIG. 5 and subsequent figures.

FIG. 5 is a diagram illustrating another example of a system driven in a signal processing device.

Referring to the figure, the system 500 of FIG. 5 illustrates that the first virtual machine 520, which is a server virtual machine, the second virtual machine 530, which is a guest virtual machine, and the third virtual machine 540, which is a guest virtual machine, can be executed on the hypervisor 505 in the processor 175 of the signal processing device 170.

The second virtual machine 530 can be a virtual machine for the cluster display 180*a*, and the third virtual machine 540 can be a virtual machine for the AVN display 180*b*.

For example, the second virtual machine 530 and the third virtual machine 540 can be operated for image rendering of the cluster display 180*a* and the AVN display 180*b*, respectively.

In some implementations, the system 500 driven in the signal processing device 170 of FIG. 5 illustrates that a legacy virtual machine 510 can also be executed on the hypervisor 505 in the processor 175.

The legacy virtual machine 510 can include an interface 511 for data communication with the memory 140 and Ethernet communication.

The figure illustrates that the interface 511 is a physical device driver, however, various modifications are possible.

In some implementations, the legacy virtual machine 510 can further include a virtual input and output device backend (virtio-backend) interface 512 for data communication with the second and third virtual machines 530 and 540.

The first virtual machine 520 can include an interface 521 for input and output of audio data, radio data, USB data, and wireless communication data and an input and output server interface 522 for data communication with the guest virtual machines.

For example, the first virtual machine 520, which is a server virtual machine, can provide inputs/outputs (I/O) that can be difficult to virtualize with standard virtualization technology (VirtIO) to a plurality of guest virtual machines, such as the second and third virtual machines 530 and 540.

In some implementations, the first virtual machine 520, which is a server virtual machine, can control radio data and audio data at a supervisor level, and can provide the data to a plurality of guest virtual machines, such as the second and third virtual machines 530 and 540.

In some implementations, the first virtual machine 520 can perform a supervisory service for system and display management and a system service for external device connection control and vehicle information management. Consequently, internal system management can be efficiently performed.

In some implementations, the first virtual machine 520, which is a server virtual machine, can process vehicle data, sensor data, and surroundings-of-vehicle information, and can provide the processed data or information to a plurality of guest virtual machines, such as the second and third virtual machines 530 and 540.

In some implementations, the first virtual machine 520 can provide supervisory services, such as processing of vehicle data and audio routing management.

Next, the second virtual machine 530 can include an input and output client interface 532 for data communication with the first virtual machine 520 and APIs 533 configured to control the input and output client interface 532.

In addition, the second virtual machine 530 can include a virtio-backend interface 531 for data communication with the legacy virtual machine 510.

The second virtual machine 530 can receive memory data by communication with the memory 140 or Ethernet data by Ethernet communication from the virtio-backend interface 512 of the legacy virtual machine 510 through the virtio-backend interface.

In some implementations, the third virtual machine 540 can include an input and output client interface 542 for data communication with the first virtual machine 520 and APIs 543 configured to control the input and output client interface 542.

In addition, the third virtual machine 540 can include a virtio-backend interface 541 for data communication with the legacy virtual machine 510.

The third virtual machine 540 can receive memory data by communication with the memory 140 or Ethernet data by Ethernet communication from the virtio-backend interface 512 of the legacy virtual machine 510 through the virtio-backend interface 541.

In some implementations, the legacy virtual machine 510 can be provided in the first virtual machine 520.

In the system 500, CAN communication data can be input and output only in the first virtual machine 520, but can be provided to a plurality of guest virtual machines, such as the second and third virtual machines 530 and 540, through data processing in the first virtual machine 520. Consequently, 1:N data communication by processing of the first virtual machine 520 can be achieved.

In addition, in the system 500 of FIG. 5, audio data, radio data, USB data, and wireless communication data can be input and output only in the first virtual machine 520, but can be provided to a plurality of guest virtual machines, such as the second and third virtual machines 530 and 540, through data processing in the first virtual machine 520. Consequently, 1:N data communication by processing of the first virtual machine 520 can be achieved.

In some implementations, in the system 500 of FIG. 5, touch input to the first display 180*a* or the second display 180*b* is input only to the first virtual machine 520 and is not input to the second virtual machine 530 and the third virtual machine 540. Information regarding the touch input can be transmitted to the second virtual machine 530 or the third virtual machine 540.

Consequently, the touch input can be rapidly and accurately processed. In addition, the touch input can be rapidly and accurately processed even though the number of virtual machines that are driven is increased.

In some implementations, in the system 500 of FIG. 5, the second and third virtual machines 530 and 540 can be operated based on different operating systems.

For example, the second virtual machine 530 can be operated based on a Linux OS, and the third virtual machine 540 can be operated based on a Web OS.

In the first virtual machine 520, the shared memory 508 based on the hypervisor 505 can be set for data sharing, even though the second and third virtual machines 530 and 540 are operated based on different operating systems. Even though the second and third virtual machines 530 and 540 are operated based on different operating systems, therefore, the same data or the same images can be shared in a synchronized state. Eventually, the plurality of displays 180*a* and 180*b* can display the same data or the same images in a synchronized state.

In some implementations, the first virtual machine 520 transmits information regarding the touch input to the second virtual machine 530 or the third virtual machine 540 even though the second and third virtual machines 530 and 540 are operated based on different operating systems. Consequently, the touch input can be rapidly and accurately processed even though the second and third virtual machines 530 and 540 are operated based on different operating systems (OS).

Figure 6:
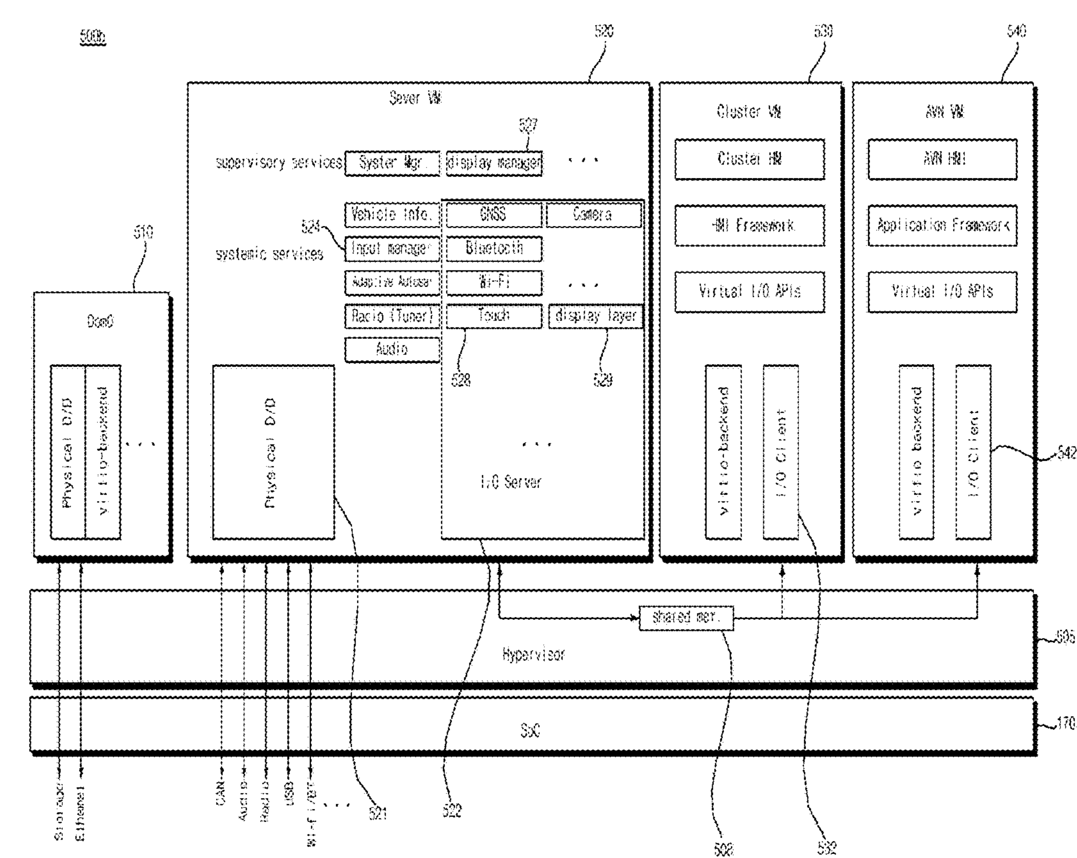
FIG. 6 is a diagram illustrating another example of the system driven in the signal processing device.

In some implementations, the first virtual machine 520 can include a display manager 527 configured to control overlays displayed on the first display 180*a* and the second display 180*b* and a display layer server 529 (see FIG. 6).

The display layer server 529 can receive a first overlay provided by the second virtual machine 530 and a second overlay provided by the third virtual machine 540.

In some implementations, the display layer server 529 can transmit a virtual overlay, which is different from the first overlay or the second overlay, to at least one of the second virtual machine 530 or the third virtual machine 540.

In some implementations, the display manager 527 in the first virtual machine 520 can receive the first overlay provided by the second virtual machine 530 and the second overlay provided by the third virtual machine 540 through the display layer server 529.

The display manager 527 in the first virtual machine 520 can be configured to transmit the virtual overlay, which is different from the first overlay or the second overlay, to at least one of the second virtual machine 530 or the third virtual machine 540 through the display layer server 529.

In response thereto, the second virtual machine 530 can be configured to combine and display the first overlay and the virtual overlay on the first display 180*a*.

In addition, the third virtual machine 540 can be configured to combine and display the second overlay and the virtual overlay on the second display 180*b*.

In some implementations, the first virtual machine 520 can include an input manager 524 configured to receive an input signal from the outside. In some implementations, the input signal can be an input signal from a predetermined button (start button) in the vehicle, a touch input signal, or a voice input signal.

For example, the input manager 524 in the first virtual machine 520 can receive touch input from the first display 180*a* or the second display 180*b*.

In some implementations, the first virtual machine 520 can include a touch server 528 configured to transmit information regarding the touch input related to the touch input from the first display 180*a* or the second display 180*b* to the second virtual machine 530 or the third virtual machine 540.

For example, in response to touch input corresponding to the first display 180*a*, the touch server 528 in the first virtual machine 520 can transmit information regarding the touch input to the second virtual machine 530.

In some implementations, the touch server 528 in the first virtual machine 520 can receive the touch input from the first display 180*a* or the second display 180*b*.

In some implementations, the first virtual machine 520 includes a first interface 521 configured to receive sensor data from the sensor device 760 in the vehicle 200 and a radio signal from the tuner 105 in the vehicle 200 and an input and output server interface 522 configured to transmit data corresponding to the sensor data or the radio signal received from the first interface 521 to at least one of the second virtual machine 530 or the third virtual machine 540. Consequently, the sensor data can be rapidly received and processed.

In some implementations, the second virtual machine 530 and the third virtual machine 540 can include input and output client interfaces 532 and 542 configured to receive the data corresponding to the sensor data or the radio signal from the first interface 521 in the first virtual machine 520. Consequently, the sensor data can be rapidly shared.

In some implementations, the second virtual machine 530 and the third virtual machine 540 do not perform data communication with the sensor device 760 in the vehicle 200 and the tuner 105 in the vehicle 200. Consequently, the sensor data can be rapidly received and processed.

In some implementations, the first virtual machine 520 can be configured to store the data corresponding to the sensor data or the radio signal in the shared memory 508, and at least one of the second virtual machine 530 or the third virtual machine 540 can receive the data corresponding to the sensor data or the radio signal stored in the shared memory 508. Consequently, the data corresponding to the sensor data or the radio signal can be rapidly received and processed.

In some implementations, the first virtual machine 520 can transmit a buffer index regarding the shared memory 508, in which the data corresponding to the sensor data or the radio signal are stored, to the second virtual machine 530 or the third virtual machine 540, and the second virtual machine 530 or the third virtual machine 540 can read the data corresponding to the sensor data or the radio signal stored in the shared memory 508 based on the received buffer index. Consequently, the data corresponding to the sensor data or the radio signal can be rapidly shared.

In some implementations, the first virtual machine 520 can receive and process wheel speed sensor data of the vehicle 200 through the first interface 521, and can transmit the processed wheel speed sensor data or speed information corresponding to the processed wheel speed sensor data to at least one of the second virtual machine 530 or the third virtual machine 540 through the input and output server interface 522. Consequently, the wheel speed sensor data of the vehicle 200 can be rapidly shared.

In some implementations, the first virtual machine 520 can receive and process air conditioning data of the vehicle 200 through the first interface 521, and can transmit the processed air conditioning data or in-vehicle temperature information corresponding to the processed air conditioning data to at least one of the second virtual machine 530 or the third virtual machine 540 through the input and output server interface 522. Consequently, the air conditioning data of the vehicle 200 can be rapidly shared.

In some implementations, the sensor data from the sensor device 760 in the vehicle 200 can be received based on CAN communication, and the first interface 521 in the first virtual machine 520 in the processor 175 can further receive USB data or Bluetooth communication data. Consequently, CAN communication-based data can be rapidly shared.

FIG. 6 is a diagram illustrating another example of the system driven in the signal processing device.

Referring to the figure, in the system 500*b* driven by the processor 175 in the signal processing device 170, the processor 175 in the signal processing device 170 can execute the first to third virtual machines 520 to 540 on the hypervisor 505 in the processor 175, and the first virtual machine 520 in the processor 175 is configured to set the shared memory 508 based on the hypervisor 505 for transmission of data to the second and third virtual machines 530 and 540.

For example, information regarding touch input can be illustrated as the data. Consequently, the information regarding touch input can be transmitted to the second virtual machine 530 or the third virtual machine 540. Eventually, the touch input to the first display 180*a* or the second display 180*b* can be rapidly and accurately processed. In addition, the touch input can be rapidly and accurately processed even though the number of virtual machines that are driven is increased.

As another example, image data can be illustrated as the data. Consequently, an image can be displayed on the first display 180*a* or the second display 180*b*.

In some implementations, in response to the same image data being shared in the shared memory 508, the plurality of displays 180*a* and 180*b* in the vehicle can display the same data in a synchronized state.

As another example, CAN communication data, audio data, radio data, USB data, wireless communication data, or position information data can be illustrated as the data. Consequently, information regarding the data can be displayed on the first display 180*a* or the second display 180*b*.

In some implementations, the legacy virtual machine 510 can transmit memory data from the memory 140 or Ethernet data by Ethernet communication to the second and third virtual machines 530 and 540 using the shared memory 508 based on the hypervisor 505. Consequently, information corresponding to the memory data or the Ethernet data can be displayed on the first display 180*a* or the second display 180*b*.

In some implementations, the first virtual machine 520 in the system 500*b* of FIG. 6 can include a display manager 527, a display layer server 529, an input manager 524, and a touch server 528, similar to the first virtual machine 520 in the system 500 of FIG. 5.

In some implementations, the input and output server interface 522 in the first virtual machine 520 in the system 500*b* of FIG. 6 can include a display layer server 529 and a touch server 528, unlike FIG. 5.

The operation of the display manager 527, the display layer server 529, the input manager 524, and the touch server 528 is the same to FIG. 5, and therefore a description thereof will be omitted.

In some implementations, the first virtual machine 520 of FIG. 6 can further include a system manager for overall system control, a vehicle information manager for vehicle information management, an audio manager for audio control, and a radio manager for radio control.

In some implementations, the input and output server interface 522 in the first virtual machine 520 in the system 500*b* of FIG. 6 can further include a global navigation satellite system (GNSS) server for GPS information input and output, a Bluetooth server for Bluetooth input and output, a Wi-Fi server for Wi-Fi input and output, and a camera server for camera data input and output.

Figure 7:
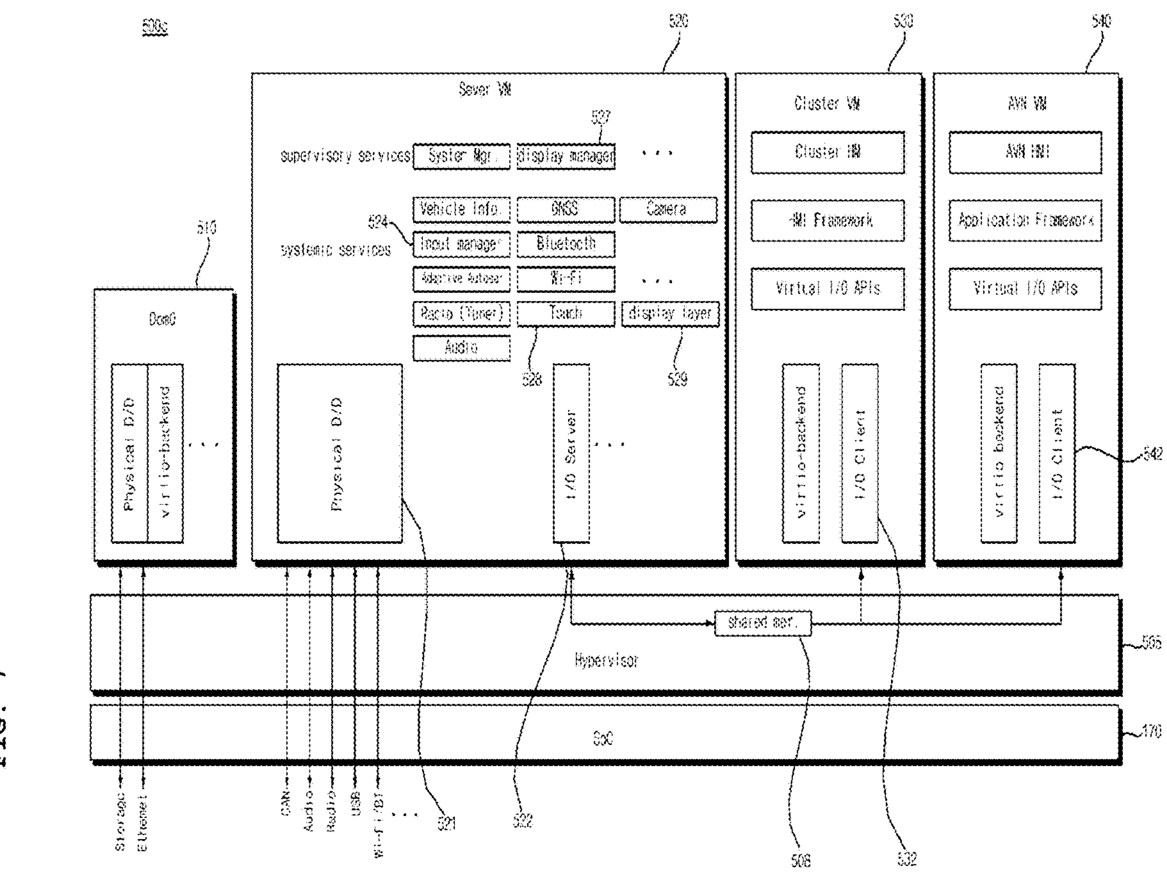
FIG. 7 is a diagram illustrating another example of the system driven in the signal processing device.

FIG. 7 is a diagram illustrating another example of the system driven in the signal processing device.

Referring to the figure, the system 500*c* driven by the processor 175 in the signal processing device of FIG. 7 is almost similar to the system 500*b* of FIG. 6.

For example, like FIG. 6, the processor 175 of FIG. 7 executes the first to third virtual machines 520 to 540 on the hypervisor 505 in the processor 175.

In FIG. 7, however, the display layer server 529 and the touch server 528 can be provided and executed in the first virtual machine 520 outside the input and output server interface 522, unlike FIG. 6.

In addition, the GNSS server for GPS information input and output, the Bluetooth server for Bluetooth input and output, the Wi-Fi server for Wi-Fi input and output, and the camera server for camera data input and output can be provided and executed in the first virtual machine 520 outside the input and output server interface 522.

For example, the display manager 527, the display layer server 529, the input manager 524, and the touch server 528 can be provided and executed in the first virtual machine 520.

In some implementations, the input and output server interface 522 in the first virtual machine 520 in the system 500*b* of FIG. 6 can include a display layer server 529 and a touch server 528.

The operation of the display manager 527, the display layer server 529, the input manager 524, and the touch server 528 is the same to FIGS. 5 and 6, and therefore a description thereof will be omitted.

Figure 8:
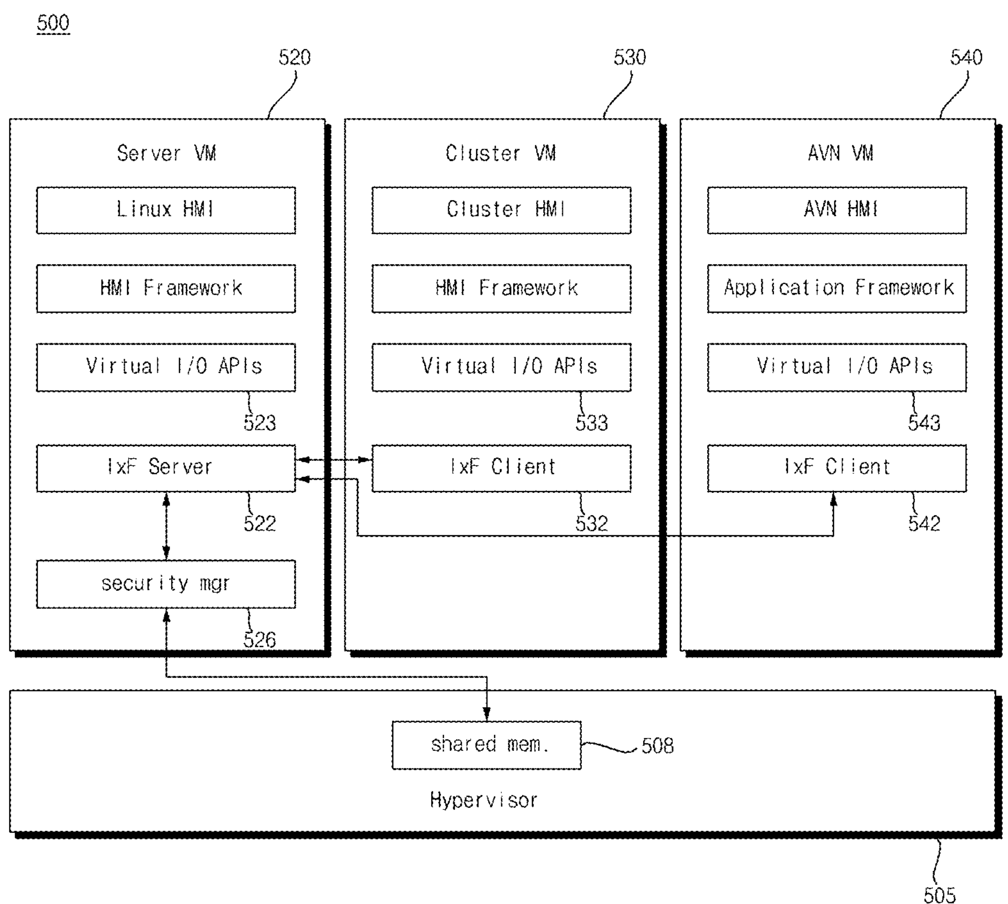
FIGS. 8, 9A, and 9B are diagrams referred to in the description of FIG. 5.
Figure 9A:
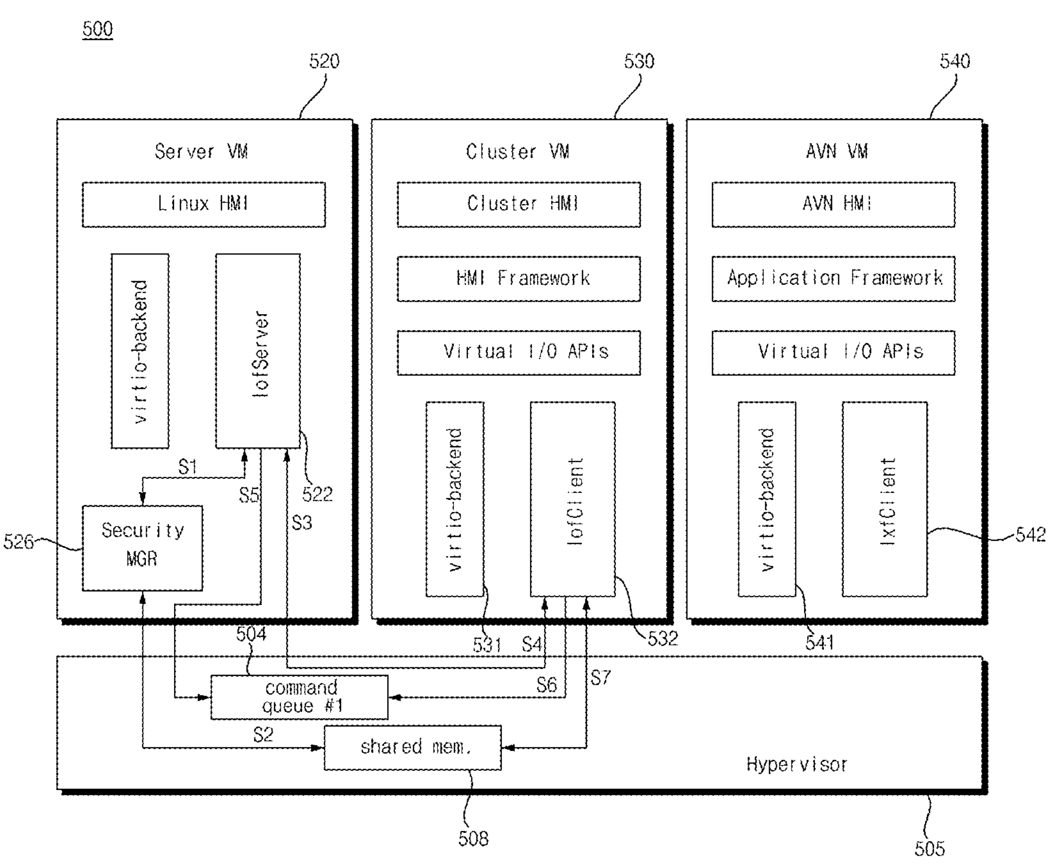
Figure 9B:
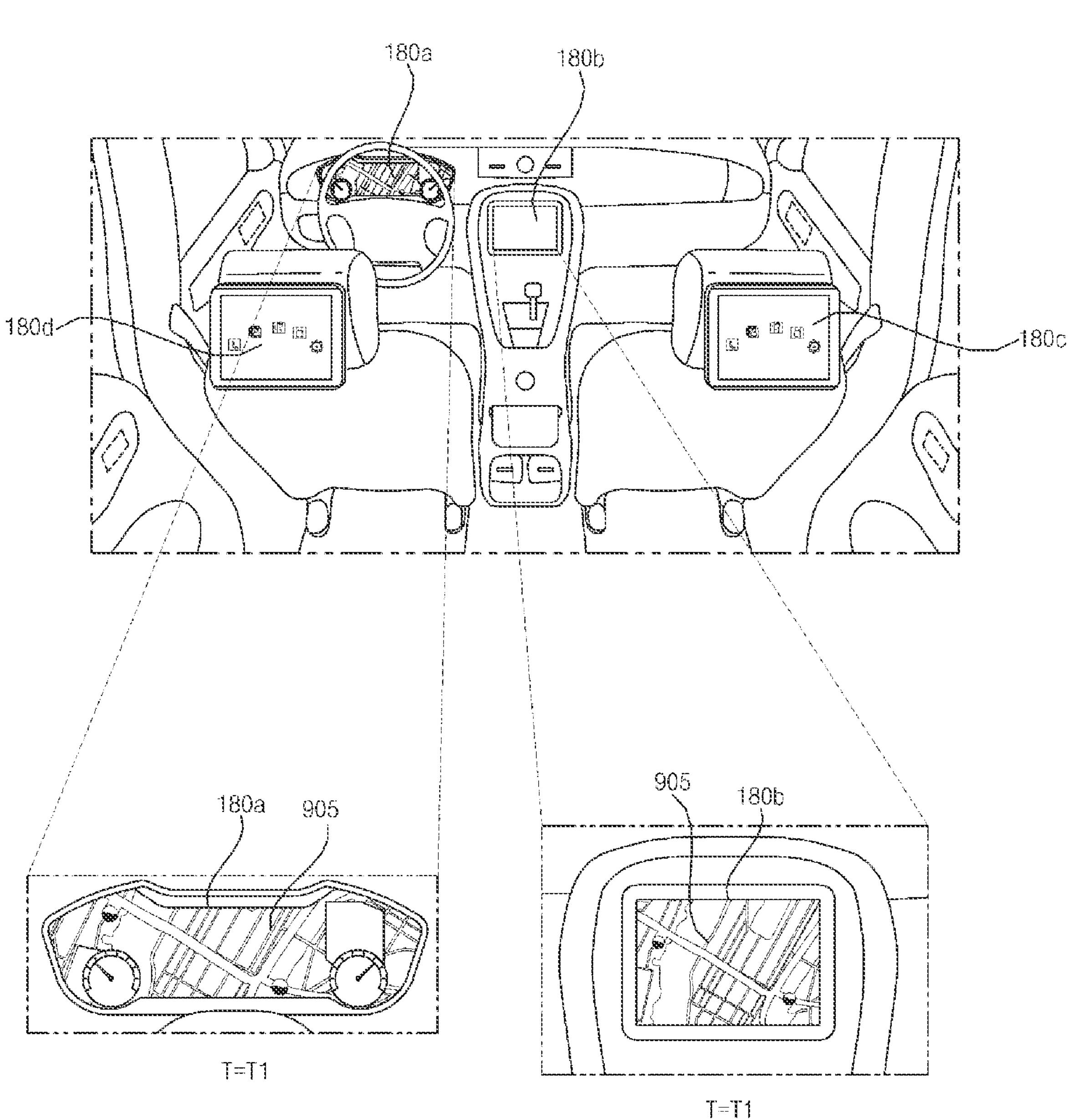

FIGS. 8, 9A, and 9B are diagrams referred to in the description of FIG. 5.

First, FIG. 8 illustrates that the first to third virtual machines 520 to 540 can be executed on the hypervisor 505 in the processor 175 of the system 500 and that the first virtual machine 520 in the processor 175 is configured to set the shared memory 508 based on the hypervisor 505 to transmit the same data to the second virtual machine 530 and the third virtual machine 540.

Consequently, the first display 180*a* and the second display 180*b* in the vehicle can display the same images in a synchronized state.

In some implementations, high-speed data communication can be performed between the plurality of virtual machines. Furthermore, high-speed data communication can be performed even though the plurality of virtual machines is driven by different operating systems.

In some implementations, the first virtual machine 520 in the processor 175 may not allocate memories corresponding in number to the virtual machines but can use a single shared memory 508, not memory allocation in response to transmitting the data processed by the first virtual machine 520 to another virtual machine. Consequently, 1:N data communication using the shared memory 508, not 1:1 data communication, can be performed between the virtual machines.

In some implementations, the first virtual machine 520 in the processor 175 can include an input and output server interface 522 and a security manager 526.

In some implementations, the second virtual machine 530 and the third virtual machine 540 can include input and output client interfaces 532 and 542, respectively. Consequently, high-speed data communication between the plurality of virtual machines can be performed using the input and output server interface 522 and the input and output client interfaces 532 and 542.

The input and output server interface 522 in the first virtual machine 520 can receive requests for transmission of the same data from the input and output client interfaces 532 and 542 in the second virtual machine 530 and the third virtual machine 540, and can transmit shared data to the shared memory 508 through the security manager 526 based thereon. Consequently, the shared data can be rapidly and accurately shared.

FIG. 9A is a diagram illustrating transmission of shared data in more detail.

Referring to the figure, to transmit shared data, the input and output server interface 522 in the first virtual machine 520 can transmit a request for allocation of the shared memory 508 to the security manager 526 (S1).

Subsequently, the security manager 526 can allocate the shared memory 508 using the hypervisor 505 (S2), and can write shared data in the shared memory 508.

In some implementations, the input and output client interfaces 532 and 542 can transmit a request for connection to the input and output server interface 522 after allocation of the shared memory 508 (S3).

In some implementations, the input and output server interface 522 transmits information regarding shared memory 508 including key data to the input and output client interfaces 532 and 542 after allocation of the shared memory 508 (S4). In some implementations, the key data can be private key data.

In some implementations, the first virtual machine 520 in the processor 175 can transmit information regarding the shared memory 508 to the second virtual machine 530 and the third virtual machine 540 after setting of the shared memory 508.

Subsequently, the input and output server interface 522 in the first virtual machine 520 can be configured to generate a command or a command queue for event processing, other than data, to control distributed processing between the virtual machines (S5).

The figure illustrates that a command queue is generated in a command queue buffer 504 in the hypervisor 505 under control of the input and output server interface 522. However, the present disclosure is not limited thereto, and the command queue can be generated in the first virtual machine 520, not the hypervisor 505, under control of the input and output server interface 522.

Subsequently, the input and output client interfaces 532 and 542 can access the command queue buffer 504 to receive the generated command queue or information regarding the command queue (S6).

For example, in response to the commands transmitted to the input and output client interfaces 532 and 542 being the same, the generated command queues can be the same.

As another example, in response to the commands transmitted to the input and output client interfaces 532 and 542 being different from each other, different command queues can be transmitted to the input and output client interfaces 532 and 542.

Subsequently, the input and output client interfaces 532 and 542 can access the shared memory 508 based on the received key data (S5), and can copy or read the shared data from the shared memory 508 (S7).

Particularly, in response to the input and output client interfaces 532 and 542 receiving the same shared data, the input and output client interfaces 532 and 542 can access the shared memory 508 based on the same command queues and the same key data (S5), and can copy or read the shared data from the shared memory 508.

Consequently, the second virtual machine 530 and the third virtual machine 540 can access the shared memory 508, and can eventually share the shared data.

For example, in the case in which the shared data are image data, the second virtual machine 530 and the third virtual machine 540 can share the image data, and eventually the plurality of displays 180*a* and 180*b* in the vehicle can display the same shared images in a synchronized state.

FIG. 9B illustrates that, by the system 500 of FIG. 9A, the second virtual machine 530 can control the first display 180*a* to display image data received through the shared memory 508, and the third virtual machine 540 can control the second display 180*b* to display image data received through the shared memory 508.

FIG. 9B illustrates that an image 905*a* displayed on the first display 180*a* and an image 905*b* displayed on the second display 180*b* are synchronized, whereby the same images 905*a* and 905*b* are displayed at the time of T1.

For example, image data processed by the first virtual machine 520 in the processor 175 are transmitted to the second virtual machine 530 and the third virtual machine 540 through the shared memory 508, and the first image 905*a* displayed on the first display 180*a* and the second image 905*b* displayed on the second display 180*b* based on the image data can be the same. Consequently, the plurality of displays 180*a* and 180*b* in the vehicle can display the same images in a synchronized state.

FIGS. 10A-C, 11A-D, 12A-C, and 13A-13D are diagrams referred to in the description of FIGS. 5, 6, and 7.

First, FIG. 10A illustrates that the second virtual machine 530 and the third virtual machine 540 can generate overlays and transmit the generated overlays to the first virtual machine 520 through the input and output client interfaces 532 and 542, respectively.

The second virtual machine 530 can generate a first overlay 1012, which is a physical overlay. Specifically, a window manager 537 in the second virtual machine 530 can generate a first overlay 1012, which is a physical overlay.

The input and output client interface 532 in the second virtual machine 530 can write the first overlay 1012 in the shared memory 508 (ST1), and the first virtual machine 520 can receive the first overlay 1012 written in the shared memory 508 using the received buffer index (ST3).

The third virtual machine 540 can generate a second overlay 1014 and a third overlay 1016, which are physical overlays. Specifically, a window manager 547 in the third virtual machine 540 can generate a second overlay 1014 and a third overlay 1016, which are physical overlays.

The input and output client interface 542 in the third virtual machine 540 can write the second overlay 1014 and the third overlay 1016 in the shared memory 508 (ST2), and the first virtual machine 520 can receive the second overlay 1014 and the third overlay 1016 written in the shared memory 508 using the received buffer index (ST3).

In some implementations, vehicle speed information displayed in the first overlay 1012 can be based on sensor data from the sensor device 760 in the vehicle 200, received by the first interface 521 in the first virtual machine 520.

For example, the first virtual machine 520 can receive and process wheel speed sensor data of the vehicle 200 through the first interface 521, and can transmit the processed wheel speed sensor data or speed information corresponding to the processed wheel speed sensor data to the second virtual machine 530 through the input and output server interface 522.

Consequently, the second virtual machine 530 can generate the first overlay 1012 based on the vehicle speed information.

In some implementations, in-vehicle temperature information displayed in the third overlay 1016 can be based on sensor data from the sensor device 760 in the vehicle 200, received by the first interface 521 in the first virtual machine 520.

For example, the first virtual machine 520 can receive and process air conditioning data of the vehicle 200 through the first interface 521, and can transmit the processed air conditioning data or in-vehicle temperature information corresponding to the processed air conditioning data to the third virtual machine 540 through the input and output server interface 522.

Consequently, the third virtual machine 540 can generate the third overlay 1016 based on the in-vehicle temperature information.

FIG. 10B illustrates that a composite overlay generated by the first virtual machine 520 is transmitted to the second virtual machine 530 and the third virtual machine 540.

Referring to the figure, the first virtual machine 520 can generate a first composite overlay 1022 using the received first overlay 1012 and third overlay 1016.

Specifically, the display manager 527 or the display layer server 529 in the first virtual machine 520 can generate a first composite overlay 1022 using the received first overlay 1012 and third overlay 1016.

The input and output server interface 522 in the first virtual machine 520 can write the first composite overlay 1022 in the shared memory 508 (ST4), and the second virtual machine 530 can receive the first composite overlay 1022 written in the shared memory 508 using the received buffer index (ST6).

The first virtual machine 520 can generate a second composite overlay 1024 using the received first to third overlays 1012, 1014, and 1016.

Specifically, the display manager 527 or the display layer server 529 in the first virtual machine 520 can generate a second composite overlay 1024 using the received first to third overlays 1012, 1014, and 1016.

The input and output server interface 522 in the first virtual machine 520 can write the second composite overlay 1024 in the shared memory 508 (ST5), and the third virtual machine 540 can receive the second composite overlay 1024 written in the shared memory 508 using the received buffer index (ST7).

FIG. 10C is a diagram illustrating the first composite overlay 1022 and the second composite overlay 1024.

The first composite overlay 1022 can be displayed on the first display 180*a*, and a vehicle speed indicator 212*a* and an in-vehicle temperature indicator 213*a* can be displayed in the first composite overlay 1022.

The second composite overlay 1024 can be displayed on the second display 180*b*, and a plurality of applications, a vehicle speed indicator 212*b*, and an in-vehicle temperature indicator 213*b* can be displayed in the second composite overlay 1024.

FIG. 11A illustrates that touch input 1101 can be performed to the in-vehicle temperature indicator 213*a* in the first composite overlay 1022 in the state in which the first composite overlay 1022 is displayed on the first display 180*a* and the second composite overlay 1024 is displayed on the second display 180*b*.

In some implementations, to rapidly process the touch input, a physical device driver is provided only in the first virtual machine 520 and is not provided in the second virtual machine 530 and the third virtual machine 540.

Consequently, the touch input 1101 to the first display 180*a* is transmitted to the first virtual machine 520, not the second virtual machine 530.

In some implementations, in response to the touch input 1101 corresponding to the overlay provided by the third virtual machine 540, among a plurality of overlays displayed on the second display 180*b*, the first virtual machine 520 can transmit information regarding the touch input to the third virtual machine 540.

To this end, the first virtual machine 520 can extract coordinate information of the touch input 1101.

In some implementations, the first virtual machine 520 can be configured to store the coordinate information of the touch input 1101 in the shared memory 508. Consequently, the touch input can be rapidly and accurately processed.

In some implementations, the first virtual machine 520 can transmit a buffer index regarding the shared memory 508 to the second virtual machine 530 or the third virtual machine 540, and the second virtual machine 530 or the third virtual machine 540 can read the coordinate information of the touch input written in the shared memory 508 based on the received buffer index.

Specifically, the input and output server interface 522 in the first virtual machine 520 can be configured to store the coordinate information of the touch input in the shared memory 508, and the input and output client interface 532 or 542 in the second virtual machine 530 or the third virtual machine 540 can read the coordinate information of the touch input written in the shared memory 508. Consequently, the touch input can be rapidly and accurately processed.

In FIG. 11A, since the touch input 1101 corresponds to the overlay provided by the third virtual machine 540, among the plurality of overlays displayed on the second display 180*b*, the first virtual machine 520 can write the coordinate information of the touch input in the shared memory 508, and the third virtual machine 540 can read the coordinate information of the touch input written in the shared memory 508 based on the received buffer index.

In some implementations, in response to information regarding the touch input corresponding to at least one overlay from the third virtual machine 540, the first virtual machine 520 can be configured to transmit the information regarding the touch input to the third virtual machine 540, and the third virtual machine 540 can be configured to change at least one overlay based on the touch input and the changed overlay is displayed on the second display 180*b*. Consequently, the changed overlay corresponding to the touch input can be rapidly and accurately displayed.

In some implementations, the third virtual machine 540 can transmit the changed overlay to the first virtual machine 520, and the first virtual machine 520 can be configured to transmit the changed overlay to the second virtual machine 530. Consequently, the changed overlay corresponding to the touch input can be rapidly and accurately displayed.

In some implementations, in response to information regarding the touch input corresponding to at least one overlay from the third virtual machine 540 while corresponding to the operation of a hardware device in the vehicle, the first virtual machine 520 can be configured to transmit the information regarding the touch input to the third virtual machine 540, and can be configured to operate the hardware device in the vehicle based on the touch input. Consequently, the operation of the hardware device corresponding to the touch input can be rapidly and accurately performed.

In some implementations, in response to information regarding the touch input corresponding to the overlay from the second virtual machine 530, the first virtual machine 520 can be configured to transmit the information regarding the touch input to the second virtual machine 530, and the second virtual machine 530 can be configured to change the overlay based on the touch input and the changed overlay is displayed on the second display 180*b*. Consequently, the changed overlay corresponding to the touch input can be rapidly and accurately displayed.

In some implementations, the second virtual machine 530 can transmit the changed overlay to the first virtual machine 520, and the first virtual machine 520 can be configured to transmit the changed overlay to the third virtual machine 540. Consequently, the changed overlay corresponding to the touch input can be rapidly and accurately displayed.

In some implementations, the processor 175 can further execute the fourth virtual machine 550 operated for the third display 180*c* on the hypervisor 505 in the processor 175, and the first virtual machine 520 in the processor 175 can receive touch input to any one of the first display 180*a* to third display 180*c* and can transmit information regarding the received touch input to any one of the second virtual machine 530 to the fourth virtual machine 550. Consequently, the touch input can be rapidly and accurately processed.

In some implementations, the first virtual machine 520 can receive and process wheel speed sensor data of the vehicle 200, and can transmit an overlay indicating the processed wheel speed sensor data or speed information corresponding to the processed wheel speed sensor data to at least one of the second virtual machine 530 or the third virtual machine 540. Consequently, the wheel speed sensor data of the vehicle can be shared by at least one virtual machine.

Figure 11B:
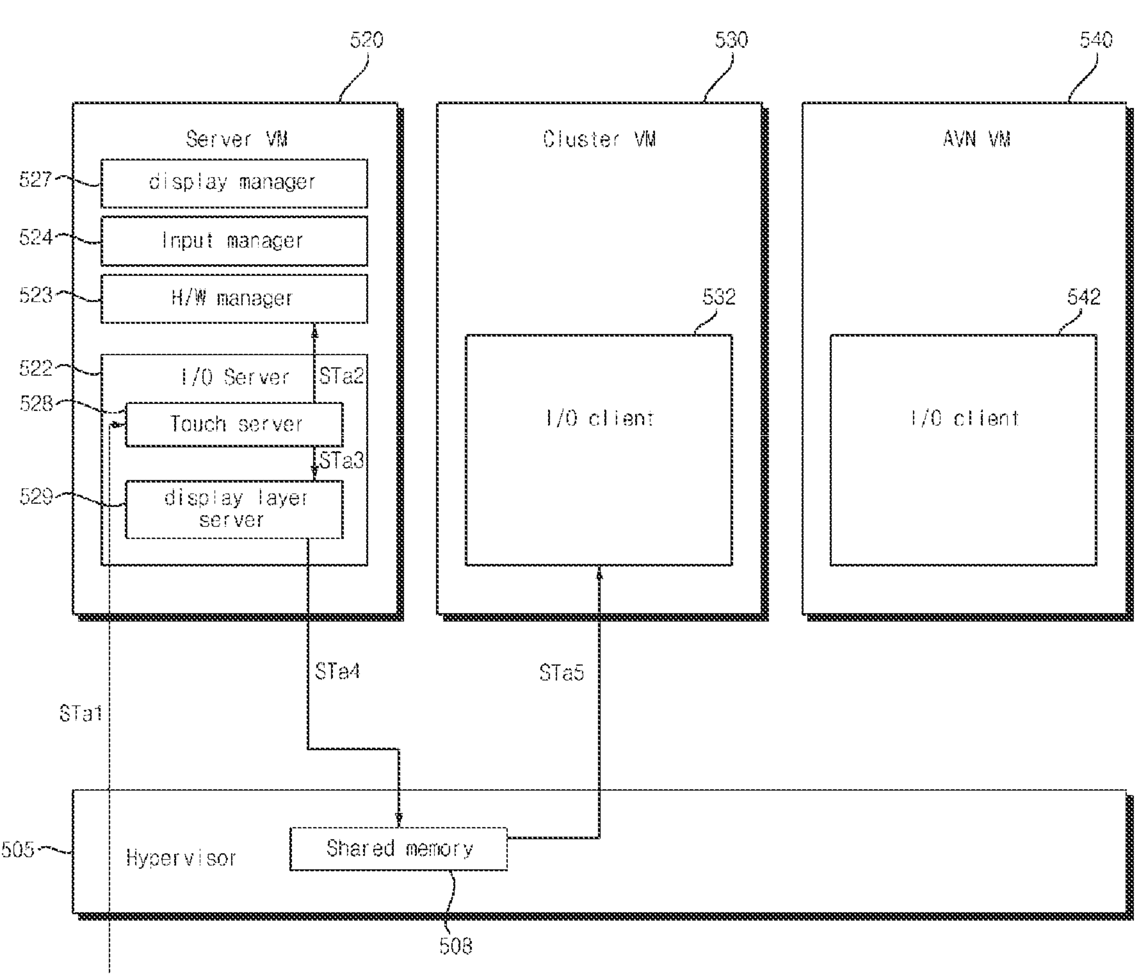

FIG. 11B is a diagram describing signal processing for the touch input of FIG. 11A.

Referring to the figure, the input and output server interface 522 in the first virtual machine 520 can receive the touch input through the physical device driver for touch input reception.

Specifically, the touch input can be transmitted to the touch server 528 in the input and output server interface 522 in the first virtual machine 520 (STa1).

Subsequently, the touch server 528 can transmit the touch input to the display manager 527 and a hardware manager 523 (STa2).

The hardware manager 523 can control an air conditioner in the vehicle such that the temperature becomes 21° C., which is lower than the current temperature, 22° C., since the touch input is an input corresponding to temperature decrease in the in-vehicle temperature indicator 213*a*.

In some implementations, the display manager 527 can perform control such that temperature information of 21° C., which is lower than the current temperature, 22° C., is displayed in the in-vehicle temperature indicator 213*a*.

Consequently, the display manager 527 or the display layer server 529 can generate an in-vehicle temperature indicator having changed temperature information (STa3).

The input and output server interface 522 in the first virtual machine 520 can write a first composite overlay including the in-vehicle temperature indicator having changed temperature information in the shared memory 508 (STa4), and the second virtual machine 530 can receive the first composite overlay written in the shared memory 508 using the received buffer index (STa5).

Figure 11C:
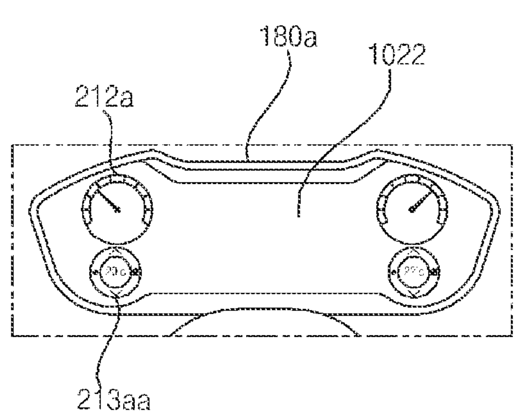
Figure 11C:
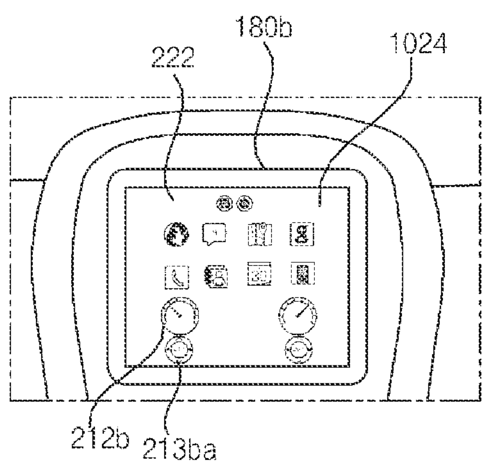

As shown in FIG. 11C, therefore, the first composite overlay 1022 having changed temperature information can be displayed on the first display 180*a*.

In some implementations, the first virtual machine 520 can change temperature information in a second composite overlay in response to the change of the temperature information of the first composite overlay.

The first virtual machine 520 can write the second composite overlay having changed temperature information in the shared memory 508 (STa4), and the third virtual machine 540 can receive the second composite overlay written in the shared memory 508 using the received buffer index.

As shown in FIG. 11C, therefore, the second composite overlay 1024 having changed temperature information can be displayed on the second display 180*b*.

Figure 11D:
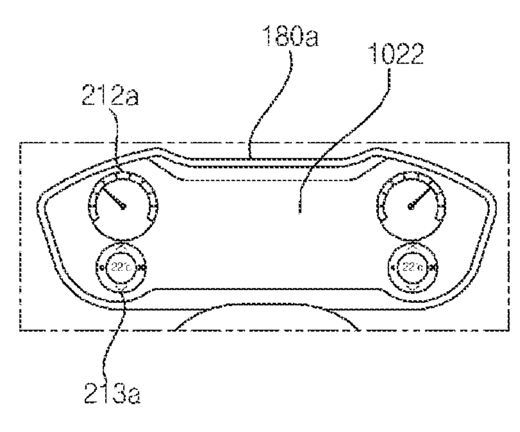
Figure 11D:
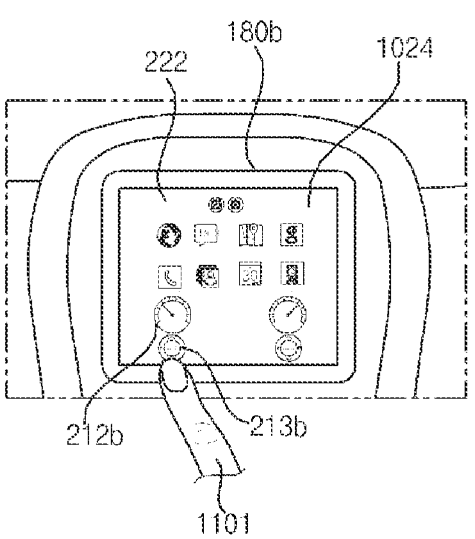

FIG. 11D illustrates that touch input 1101 can be performed to the in-vehicle temperature indicator 213*b* in the second display 180*b* in the state in which the first composite overlay 1022 is displayed on the first display 180*a* and the second composite overlay 1024 is displayed on the second display 180*b*.

In some implementations, to rapidly process the touch input, a physical device driver is provided only in the first virtual machine 520 and is not provided in the second virtual machine 530 and the third virtual machine 540.

Consequently, the touch input 1101 to the first display 180*a* can be transmitted to the first virtual machine 520, not the third virtual machine 540.

Specifically, the touch input can be transmitted to the touch server 528 in the input and output server interface 522 in the first virtual machine 520.

Subsequently, the touch server 528 can transmit the touch input to the display manager 527 and the hardware manager 523.

The hardware manager 523 can control the air conditioner in the vehicle such that the temperature becomes 21° C., which is lower than the current temperature, 22° C., since the touch input is an input corresponding to temperature decrease in the in-vehicle temperature indicator 213*b*.

In some implementations, the display manager 527 can perform control such that temperature information of 21° C., which is lower than the current temperature, 22° C., is displayed in the in-vehicle temperature indicator 213*b*.

Consequently, the display manager 527 or the display layer server 529 can generate an in-vehicle temperature indicator having changed temperature information.

The input and output server interface 522 in the first virtual machine 520 can write a second composite overlay including the in-vehicle temperature indicator having changed temperature information in the shared memory 508 (STa4), and the third virtual machine 540 can receive the second composite overlay written in the shared memory 508 using the received buffer index.

As shown in FIG. 11D, therefore, the first composite overlay 1022 having changed temperature information can be displayed on the second display 180*b*.

In addition, the first composite overlay 1022 having changed temperature information can be displayed on the first display 180*a*.

Figure 12A:
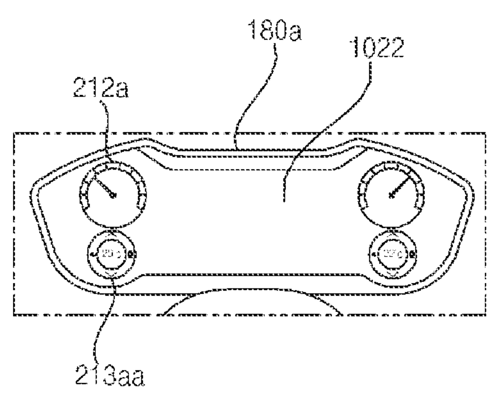
Figure 12A:
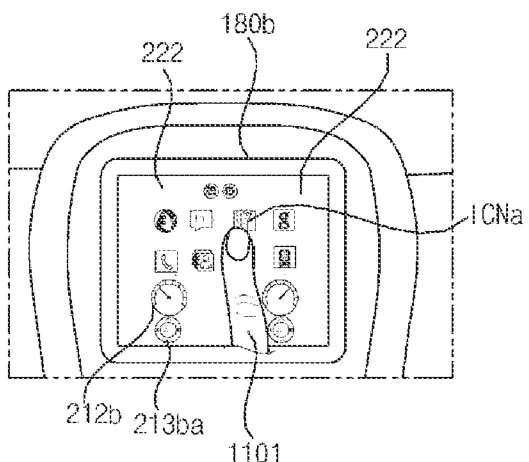

FIG. 12A illustrates that touch input 1101 can be performed to a map application ICNa, among the plurality of applications in the second display 180*b*, in the state in which the first composite overlay 1022 is displayed on the first display 180*a* and the second composite overlay 1024 is displayed on the second display 180*b*.

Figure 12B:
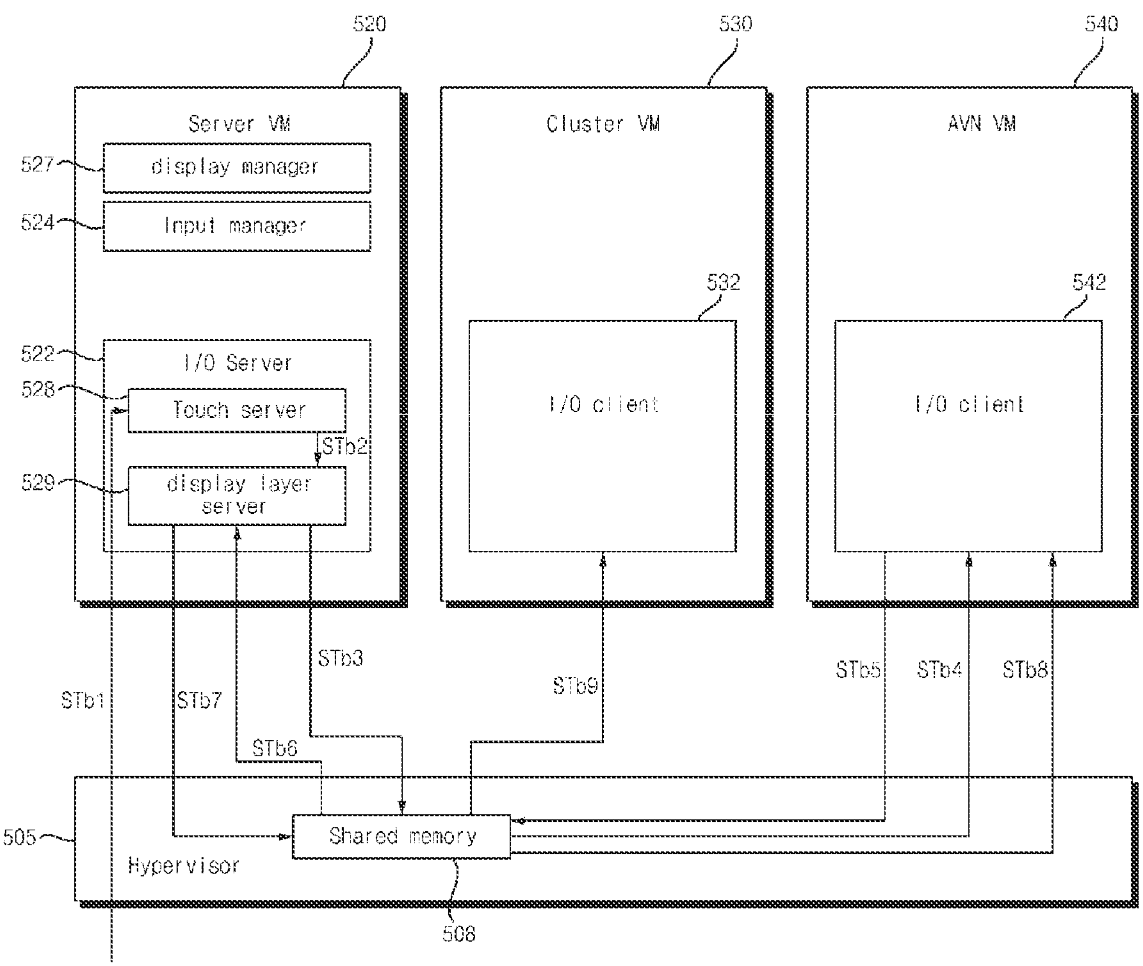

FIG. 12B is a diagramdescribing signal processing for the touch input of FIG. 12A.

Referring to the figure, the input and output server interface 522 in the first virtual machine 520 can receive the touch input through the physical device driver for touch input reception.

Specifically, the touch input can be transmitted to the touch server 528 in the input and output server interface 522 in the first virtual machine 520 (STb1).

Subsequently, the touch server 528 can transmit the touch input to the display manager 527 and the display layer server 529 (STb2).

In addition or alternatively, the touch server 528 can extract coordinate information of the touch input, and can transmit the extracted coordinate information of the touch input to the display manager 527 and the display layer server 529 (STb2).

The display manager 527 or the display layer server 529 can be configured to execute the map application ICNa, since the touch input corresponds to execution input of the map application ICNa.

Consequently, the input and output server interface 522 in the first virtual machine 520 can write a request for execution of the map application ICNa or the coordinate information of the touch input in the shared memory 508 (STb3), and the third virtual machine 540 can read the request for execution of the map application ICNa or the coordinate information of the touch input written in the shared memory 508 using the received buffer index (STb4).

The third virtual machine 540 can execute the map application ICNa according to the received request for execution of the map application ICNa or the received coordinate information of the touch input, and can generate a map layer.

The input and output client interface 542 in the third virtual machine 540 can write the map layer in the shared memory 508 (STb5), and the first virtual machine 520 can receive the map layer written in the shared memory 508 using the received buffer index (STb6).

The input and output server interface 522 in the first virtual machine 520 can generate a second composite overlay including the map layer and the vehicle speed indicator.

The input and output server interface 522 in the first virtual machine 520 can write the second composite overlay including the map layer and the vehicle speed indicator in the shared memory 508 (STb7), and the third virtual machine 540 can receive the second composite overlay written in the shared memory 508 using the received buffer index (STb8).

The third virtual machine 540 can be configured to display the second composite overlay including the map layer and the vehicle speed indicator on the second display 180*b*. Consequently, the touch input can be rapidly and accurately processed.

In addition, the input and output server interface 522 in the first virtual machine 520 can generate a first composite overlay including the map layer and the vehicle speed indicator.

The input and output server interface 522 in the first virtual machine 520 can write the first composite overlay including the map layer and the vehicle speed indicator in the shared memory 508, and the second virtual machine 530 can receive the first composite overlay written in the shared memory 508 using the received buffer index (STb9).

The second virtual machine 530 can be configured to display the first composite overlay including the map layer and the vehicle speed indicator on the first display 180*a*.

Figure 12C:
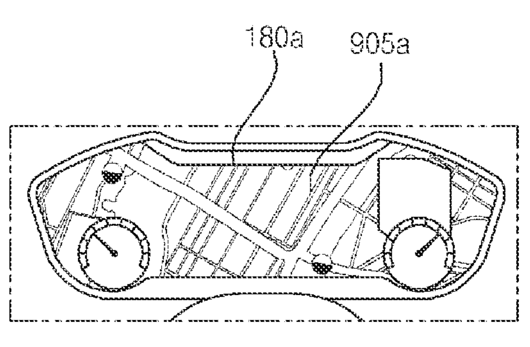
Figure 12C:
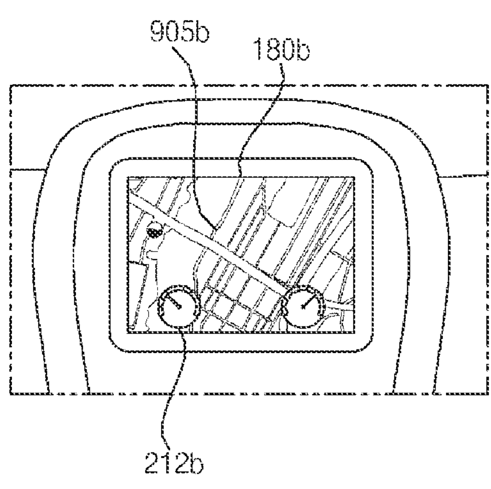

FIG. 12C illustrates that a first composite overlay 905*a* including the map layer and the vehicle speed indicator can be displayed on the first display 180*a* and a second composite overlay 905*b* including the map layer and the vehicle speed indicator is displayed on the second display 180*b* as the result of execution of the map application ICNa.

Figure 13A:
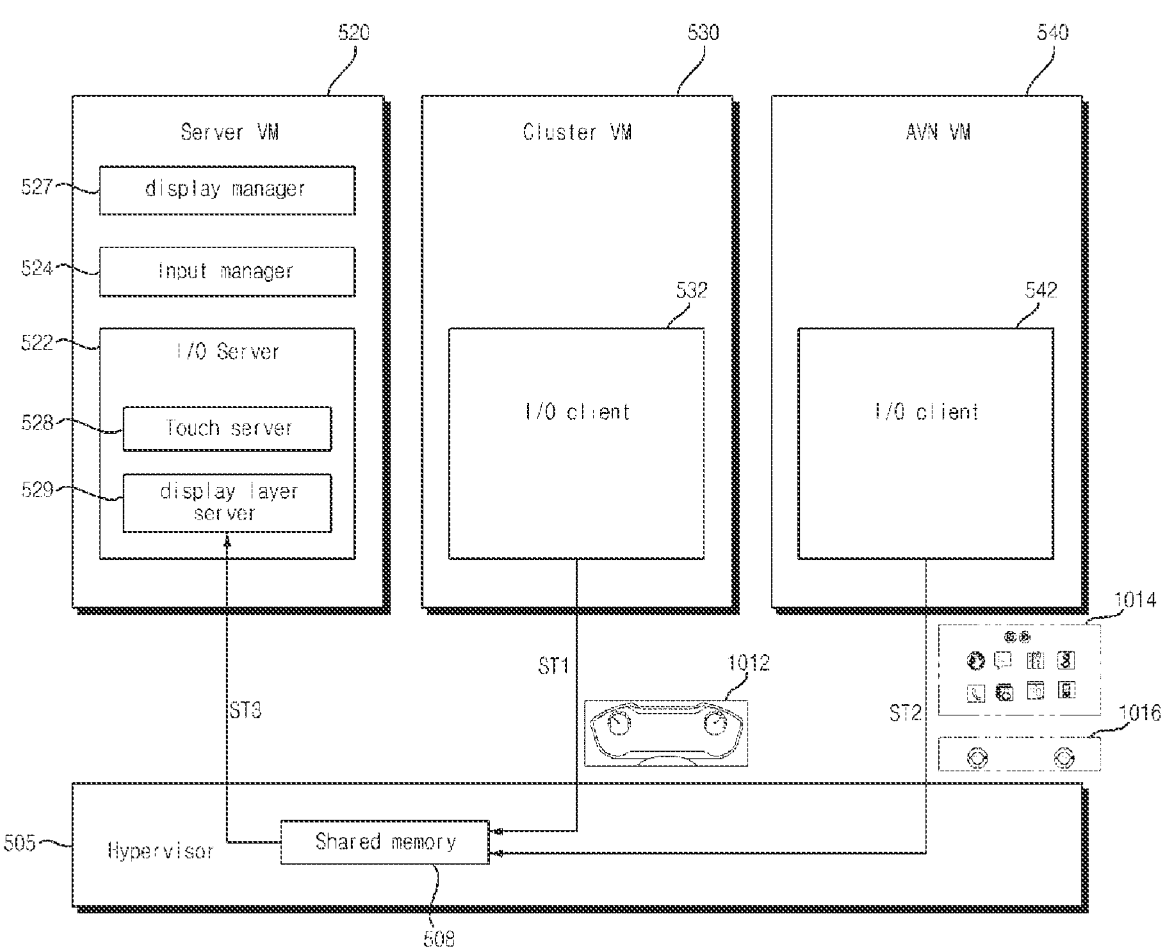

FIG. 13A illustrates that the second virtual machine 530 and the third virtual machine 540 can generate overlays and transmit the generated overlays to the first virtual machine 520 through the input and output client interfaces 532 and 542, respectively, like FIG. 10A.

Figure 13B:
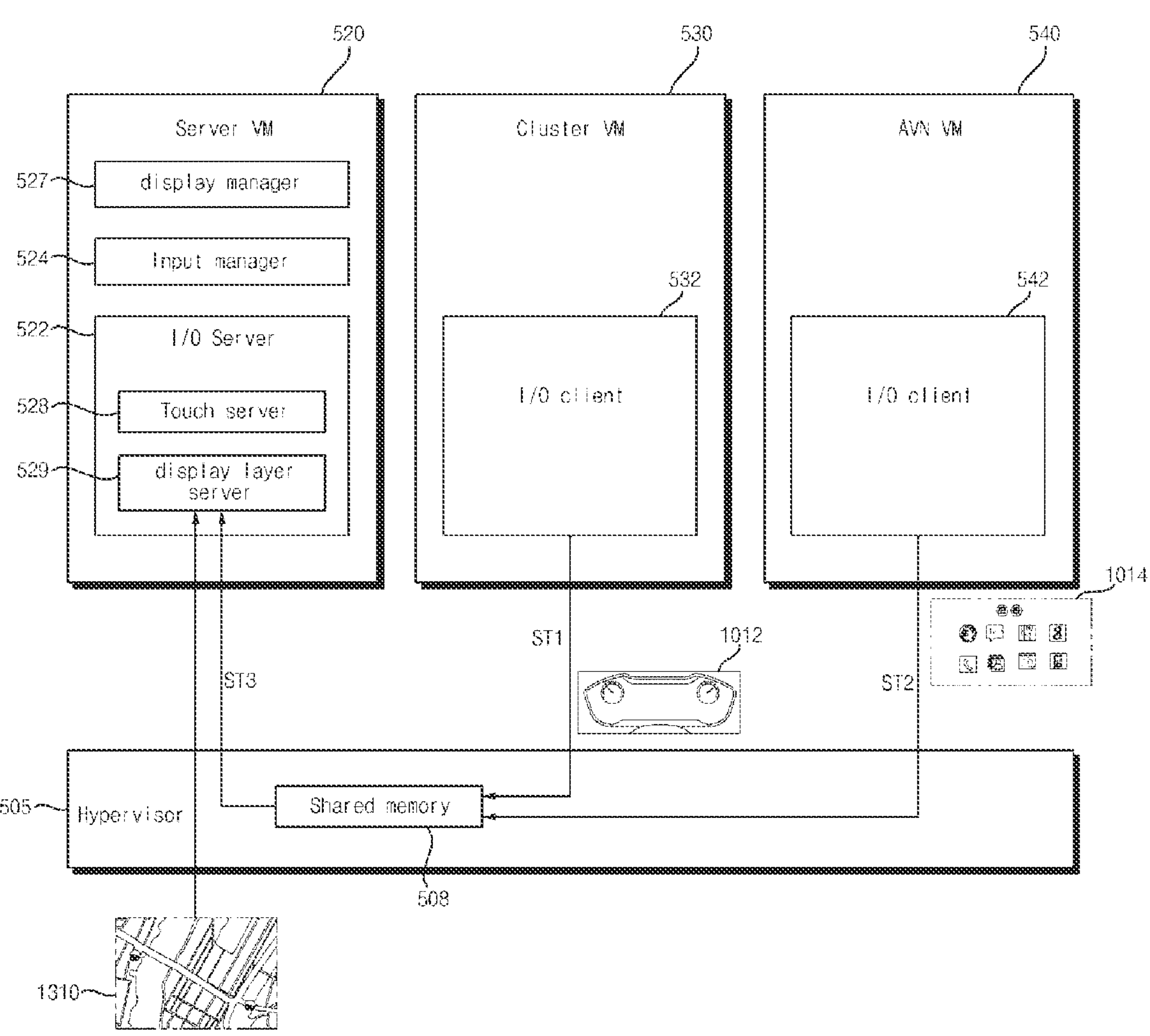

FIG. 13B illustrates that a map overlay 1310 can be received by the first virtual machine 520 through an external storage device or a communication device.

The first interface 521 in the first virtual machine 520 can receive the map overlay 1310 through the external storage device or the communication device.

Figure 13C:
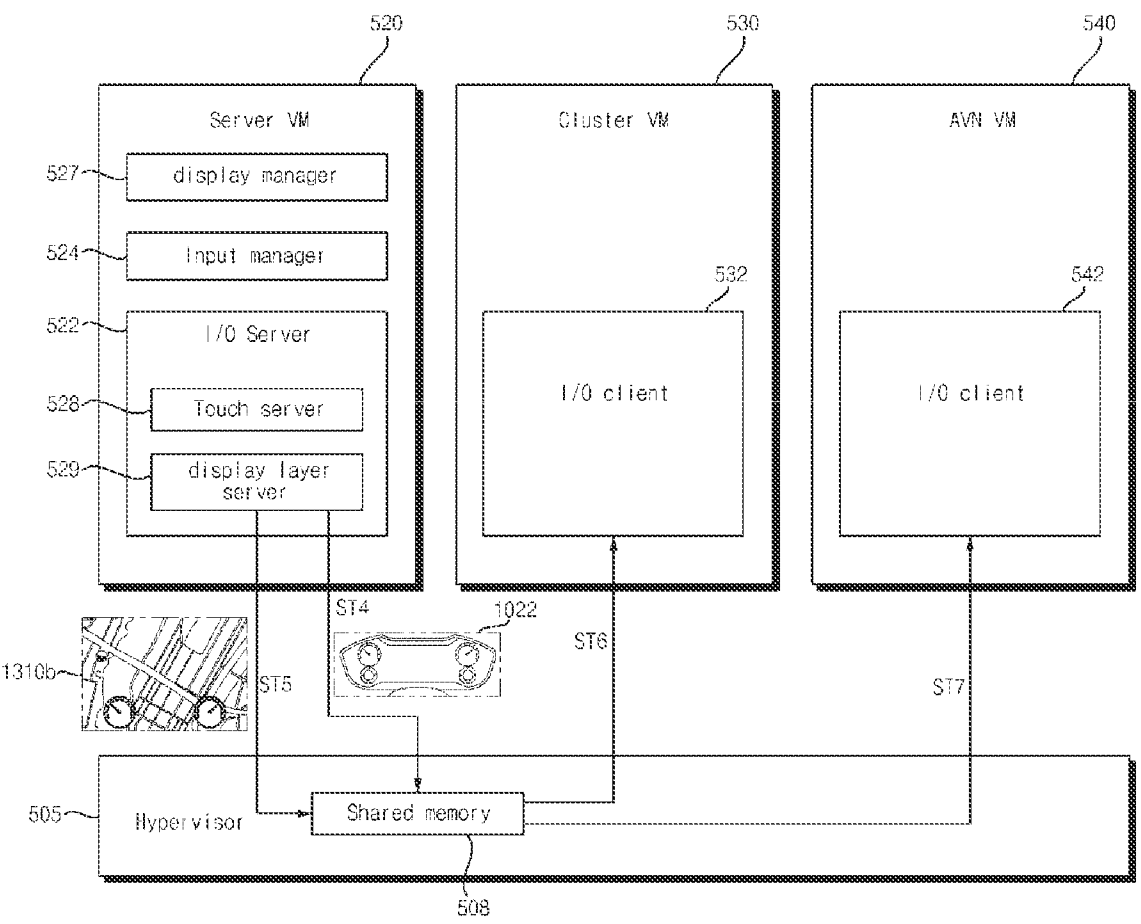

FIG. 13C illustrates that the first virtual machine 520 can transmit a map overlay 1310*b* to the outside.

Referring to the figure, the first virtual machine 520 can generate a map overlay 1310*b* including vehicle speed information based on the map overlay 1310 and the wheel speed sensor data of the vehicle 200.

For example, the display layer server 529 in the first virtual machine 520 can generate a map overlay 1310*b* including vehicle speed information.

The display layer server 529 in the first virtual machine 520 can transmit the generated map overlay 1310*b* including vehicle speed information to the outside.

In some implementations, the first virtual machine 520 can generate a first composite overlay 1022 using the received first overlay 1012 and third overlay 1016.

Specifically, the display manager 527 or the display layer server 529 in the first virtual machine 520 can generate a first composite overlay 1022 using the received first overlay 1012 and third overlay 1016.

The input and output server interface 522 in the first virtual machine 520 can write the first composite overlay 1022 in the shared memory 508 (ST4), and the second virtual machine 530 can receive the first composite overlay 1022 written in the shared memory 508 using the received buffer index (ST6).

In some implementations, the input and output server interface 522 in the first virtual machine 520 can write the map overlay 1310*b* including vehicle speed information in the shared memory 508 (ST5), and the third virtual machine 540 can receive the map overlay 1310*b* including vehicle speed information written in the shared memory 508 using the received buffer index (ST7).

Figure 13D:
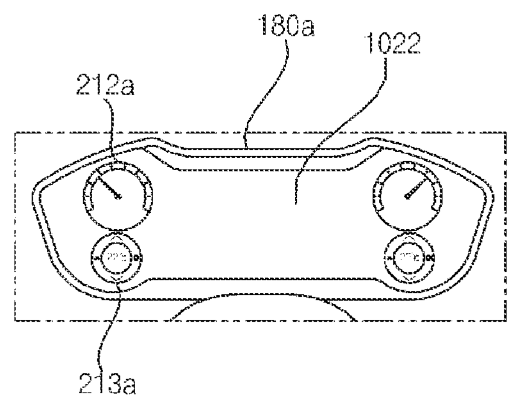
Figure 13D:
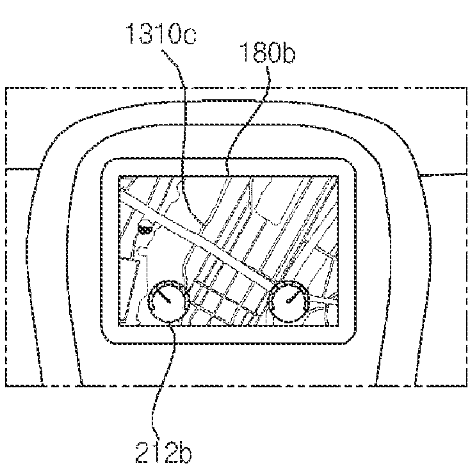

FIG. 13D illustrates the first composite overlay 1022 and the map overlay 1310*b* including vehicle speed information.

The first composite overlay 1022 can be displayed on the first display 180*a*, and a vehicle speed indicator 212*a* and an in-vehicle temperature indicator 213*a* can be displayed in the first composite overlay 1022.

The map overlay 1310*b* including vehicle speed information can be displayed on the second display 180*b*, and a map and a vehicle speed indicator 212*b* can be displayed in the map overlay 1310*b*.

In some implementations, to rapidly process sensor data, a physical device driver is provided only in the first virtual machine 520 and is not provided in the second virtual machine 530 and the third virtual machine 540.

In some implementations, a signal processing device can include a processor 175 configured to perform signal processing for a display configured to be located in a vehicle 200, wherein the processor 175 is configured to execute first, second, and third virtual machines 520, 530, and 540 on a hypervisor in the processor 175, the second virtual machine 530 is configured to be operated for a first display 180*a*, the third virtual machine 540 is configured to be operated for a second display 180*b*, and the first virtual machine 520 in the processor 175 can include a first interface 521 configured to receive CAN communication data and a radio signal from a tuner 105 in the vehicle 200 and an input and output server interface 522 configured to transmit data corresponding to the CAN communication data and the radio signal received from the first interface 521 to at least one of the second virtual machine 530 or the third virtual machine 540. Consequently, the CAN communication data can be rapidly received and processed. In particular, the CAN communication data can be rapidly shared even though the number of virtual machines is increased or the number of displays is increased. Furthermore, the CAN communication data can be rapidly shared even though operating systems of the plurality of virtual machines are different from each other.

In some implementations, the first virtual machine 520 can receive and process wheel speed sensor data of the vehicle 200 included in the CAN communication data, and can transmit the processed wheel speed sensor data or speed information corresponding to the processed wheel speed sensor data to at least one of the second virtual machine 530 or the third virtual machine 540. Consequently, the wheel speed sensor data of the vehicle 200 can be rapidly received and processed.

What is claimed is:

1. A signal processing device comprising:

a processor configured to perform signal processing for a first display and a second display that are configured to be located in a vehicle, wherein:

the processor is configured to execute first, second, and third virtual machines on a hypervisor in the processor, the second virtual machine is configured to be operated for the first display, the third virtual machine is configured to be operated for the second display, and the first virtual machine executed in the processor comprises a first interface configured to receive sensor data from a sensor device in the vehicle and a radio signal from a tuner in the vehicle, and an input and output server interface configured to transmit, to at least one of the second virtual machine or the third virtual machine, data corresponding to the sensor data or the radio signal received from the first interface, and wherein the first virtual machine is configured to:

receive touch input to the first display or the second display, transmit, to the second virtual machine or the third virtual machine, information regarding the touch input, and based on the touch input corresponding to an overlay provided by the second virtual machine among a plurality of overlays displayed on the first display, transmit the information regarding the touch input to the second virtual machine.

2. The processing device of claim 1, wherein the second virtual machine and the third virtual machine comprise input and output client interfaces configured to receive the data corresponding to the sensor data or the radio signal from the first interface.

3. The processing device of claim 1, wherein only the first virtual machine among the first, second, and third virtual machines is configured to perform data communication with the sensor device and the tuner in the vehicle.

4. The processing device of claim 1, wherein:

the first virtual machine is configured to store the data corresponding to the sensor data or the radio signal in a shared memory, and at least one of the second virtual machine or the third virtual machine is configured to receive the data corresponding to the sensor data or the radio signal stored in the shared memory.

5. The processing device of claim 4, wherein:

the first virtual machine is configured to transmit, to the second virtual machine or the third virtual machine, a buffer index regarding the shared memory in which the data corresponding to the sensor data or the radio signal are stored, and the second virtual machine or the third virtual machine is configured to read the data corresponding to the sensor data or the radio signal stored in the shared memory based on the received buffer index.

6. The processing device of claim 1, wherein the first virtual machine is configured to: receive and process wheel speed sensor data of the vehicle through the first interface, and transmit, to at least one of the second virtual machine or the third virtual machine through the input and output server interface, the processed wheel speed sensor data.

7. The processing device of claim 1, wherein the first virtual machine is configured to perform (i) a supervisory service for system and display management of the vehicle and (ii) a system service for external device connection control and vehicle information management.

8. The processing device of claim 1, wherein: the first interface is configured to receive, from the sensor device, the sensor data through controller area network (CAN) communication, and the first interface is configured to receive data through an universal serial bus (USB) or a short range wireless technology communication.

9. The processing device of claim 1, wherein only the first virtual machine among the first, second, and third virtual machines is configured to receive the touch input.

10. The processing device of claim 1, wherein the information regarding the touch input comprises coordinate information of the touch input.

11. The processing device of claim 10, wherein the first virtual machine is configured to store the coordinate information of the touch input in a shared memory.

12. The processing device of claim 11, wherein: the first virtual machine is configured to transmit a buffer index regarding the shared memory to the second virtual machine or the third virtual machine, and the second virtual machine or the third virtual machine is configured to read the coordinate information of the touch input from the shared memory based on the received buffer index.

13. The processing device of claim 1, wherein the first virtual machine is configured to, based on the touch input corresponding to an overlay provided by the third virtual machine among a plurality of overlays displayed on the first display, transmit the information regarding the touch input only to the third virtual machine among the second virtual machine and the third virtual machine.

14. The processing device of claim 1, wherein: the input and output server interface is configured to receive, from input and output client interfaces in the second virtual machine and the third virtual machine, a request for transmission of first data and transmit a request for allocation of a shared memory to a security manager executed in the first virtual machine, and the security manager is configured to allocate the shared memory using the hypervisor and write the first data in the shared memory.

15. A processing device comprising:

a processor configured to perform signal processing for a first display and a second display that are configured to be located in a vehicle, wherein:

the processor is configured to execute first, second, and third virtual machines on a hypervisor in the processor, the second virtual machine is configured to be operated for the first display, the third virtual machine is configured to be operated for the second display, and the first virtual machine executed in the processor comprises:

a first interface configured to receive sensor data from a sensor device in the vehicle and a radio signal from a tuner in the vehicle, and an input and output server interface configured to transmit, to at least one of the second virtual machine or the third virtual machine, data corresponding to the sensor data or the radio signal received from the first interface, and wherein the first virtual machine is configured to:

receive, through the first interface, air conditioning data of the vehicle, process the received air conditioning data, and transmit, to at least one of the second virtual machine or the third virtual machine through the input and output server interface, the processed air conditioning data.

16. A processing device comprising:

a processor configured to perform signal processing for a first display and a second display configured to be located in a vehicle, wherein:

the processor is configured to execute first, second, and third virtual machines on a hypervisor in the processor, the second virtual machine is configured to be operated for the first display, the third virtual machine is configured to be operated for the second display, and the first virtual machine comprises:

a first interface configured to receive controller area network (CAN) communication data and a radio signal from a tuner in the vehicle, and an input and output server interface configured to transmit, to at least one of the second virtual machine or the third virtual machine, data corresponding to the CAN communication data or the radio signal received from the first interface, wherein the first virtual machine is configured to:

receive touch input to the first display or the second display, transmit, to the second virtual machine or the third virtual machine, information regarding the touch input, and based on the touch input corresponding to an overlay provided by the second virtual machine among a plurality of overlays displayed on the first display, transmit the information regarding the touch input to the second virtual machine.

17. The processing device of claim 16, wherein the first virtual machine is configured to receive and process wheel speed sensor data of the vehicle included in the CAN communication data, and transmit, to at least one of the second virtual machine or the third virtual machine, the processed wheel speed sensor data.

18. A display apparatus for a vehicle, the display apparatus comprising:

a first display;

a second display; and a signal processing device comprising a processor configured to perform signal processing for the first display and the second display, wherein:

the processor is configured to execute first, second, and third virtual machines on a hypervisor in the processor, the second virtual machine is configured to be operated for the first display, the third virtual machine is configured to be operated for the second display, and the first virtual machine in the processor comprises:

a first interface configured to receive sensor data from a sensor device in the vehicle and a radio signal from a tuner in the vehicle; and an input and output server interface configured to transmit, to at least one of the second virtual machine or the third virtual machine, data corresponding to the sensor data or the radio signal received from the first interface, and wherein the first virtual machine is configured to:

receive touch input to the first display or the second display, transmit, to the second virtual machine or the third virtual machine, information regarding the touch input, and based on the touch input corresponding to an overlay provided by the second virtual machine among a plurality of overlays displayed on the first display, transmit the information regarding the touch input to the second virtual machine.

* * * * *